(12) United States Patent
Kodama et al.

(10) Patent No.: US 6,522,105 B2
(45) Date of Patent: Feb. 18, 2003

(54) BATTERY CHARGING APPARATUS

(75) Inventors: Koji Kodama, Hanno (JP); Masaharu Kaneko, Hanno (JP); Kazuyuki Kubo, Wako (JP); Tadashi Fujiwara, Wako (JP)

(73) Assignees: Shindengen Electric Manufacturing Co., Ltd., Tokyo (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/982,795

(22) Filed: Oct. 22, 2001

(65) Prior Publication Data

US 2002/0047686 A1 Apr. 25, 2002

(30) Foreign Application Priority Data

Oct. 23, 2000 (JP) .......................... 2000-323370
Oct. 23, 2000 (JP) .......................... 2000-323371
Oct. 23, 2000 (JP) .......................... 2000-323372

(51) Int. Cl.[7] ............................. H02J 7/00; H02J 7/04
(52) U.S. Cl. ............................... 320/155; 820/133
(58) Field of Search ................... 320/137, 139, 320/133, 125, 119, 155; 307/87

(56) References Cited

U.S. PATENT DOCUMENTS 4,536,126 A * 8/1985 Reuther .................. 290/40 R

FOREIGN PATENT DOCUMENTS

| JP | 4-308430 | 10/1992 |
| JP | 4-325839 | 11/1992 |

* cited by examiner

*Primary Examiner*—Gregory J. Toatley, Jr.
(74) *Attorney, Agent, or Firm*—Arent Fox Kintner Plotkin & Kahn, PLLC

(57) ABSTRACT

When charging a battery of a low-voltage system, a battery charging apparatus of the present invention switches on a field-effect transistor and distributes the output of a generator via a diode to the battery. Further, when charging a battery of a high-voltage system, the battery charging apparatus switches off the field-effect transistor and distributes the output of the generator via the diode to the battery. At this time, the field-effect transistor is switched, and chops the output of the generator. Then, by selecting the duty of a clock signal for controlling this switching, the output powers of the generator when charging the high-voltage system and when charging the low-voltage system are made substantially equal, reducing fluctuation in the input torque of the generator.

12 Claims, 14 Drawing Sheets

BATTERY CHARGING APPARATUS

BACKGROUND

1. Field of the Invention

The present invention relates to a battery charging apparatus for charging a high-voltage battery and a low-voltage battery which are installed in, for instance, a hybrid vehicle.

2. Related Art

With a view to environmental preservation and reduction of energy consumption, attention is recently being given to a hybrid vehicle which is fitted with a power system combining an engine and an electric motor. In this hybrid vehicle, the output of the engine is efficiently supplemented in various ways, e.g. the electric motor supplements the output of the engine when accelerating, and the battery is charged by deceleration regeneration and the like when decelerating. The hybrid vehicle is fitted with a high-voltage (e.g. 36 V) battery for supplying electrical energy to the electric motor for driving, and a low-voltage (e.g. 12 V) battery for supplying power to various types of supplementary devices, and a battery charging apparatus for charging both batteries having different voltage specifications is required.

This type of conventional battery charging apparatus will be explained using FIG. 1, described later.

The field-effect transistors Q4 to Q6 shown in FIG. 1 comprise one of the characteristic features of the battery charging apparatus according to the present invention, described below. In the conventional battery charging apparatus explained below, a rectifier (diode) is used instead of the field-effect transistors; together with diodes D1 to D3 and diodes D4 to D6, this diode forms an all-wave rectifier.

In FIG. 1, the ac output of a generator ACG is distributed via a system (open regulator) comprising the diodes D1 to D3 and field-effect transistors Q1 to Q3 to a low-voltage system battery BL, and in addition, is distributed via the diodes D4 to D6 to a high-voltage system battery BH. The ac output of the generator ACG is distributed by controlling the conduction of the field-effect transistors Q1 to Q3, provided in the low-voltage system, in synchronism with the phases of the ac output (U-phase, V-phase, and W-phase) of the generator ACG. That is, as shown in FIG. 4, during the period P1 when the U-phase voltage generated by the generator ACG is high, the field-effect transistor Q1 switches on and becomes conductive, whereby the U-phase output is supplied via the field-effect transistor Q1 to the low-voltage system battery BL.

At this time, the U-phase voltage decreases as it is pulled by the terminal voltage of the low-voltage system battery BL, but the high-voltage system battery BL does not discharge since the rectifier D4 in the high-voltage system is reverse-biased. Thereafter, when the U-phase is inverted in period P2 and the output voltage decreases, the diode D1 becomes reverse-biased. In the conventional apparatus, the battery BL is recharged via an unillustrated diode corresponding to the field-effect transistor Q4.

In period P3, during which the U-phase voltage increases, the field-effect transistor Q1 switches off and becomes nonconductive. This shuts off the power supply to the low-voltage system battery BL, increasing the U-phase voltage from the generator ACG. As a result, the diode D4 becomes sequence-biased, and the power output from the generator ACG is supplied via the diode D4 to the high-voltage system battery BH.

The battery is charged by the V-phase and W-phase outputs in the same manner.

By controlling the field-effect transistors Q1 to Q3 on the low voltage side in this way, it is possible to supplementarily charge the low-voltage and high-voltage systems, enabling both batteries to be charged by a single generator.

Incidentally, the distribution of the phase output of the generator and the like for charging the low-voltage and high-voltage systems is determined as appropriate in accordance with the charge status of the batteries in these systems.

The torque required to rotate the input axis of the generator during charging (hereinafter abbreviated as "input torque") is determined by the output voltage and output current of the generator, and there is a correlative relationship between the input torque of the generator and the power consumed in charging. When the output voltage of the generator is constant, the greater the charge current, the greater the input torque of the generator; when the output current of the generator is constant, the greater the charge voltage, the greater the input torque of the generator. Applying the rotatory power (e.g. rotary output of an engine), which is generated by the input torque, to the input axis of the generator from the outside generates power comprising electrical energy. Therefore, ideally, when the rotatory power applied to the input axis of the generator is constant, the output voltage and output current should be set so that the output power is constant.

However, in reality, even when a constant rotatory power is applied to the generator, fluctuation in the load changes the output voltage, and consequently, due to the characteristics of the generator, the output current cannot make the output power constant and the output power becomes liable to change. For this reason, as shown in FIG. 4, the size of the input torque T in the period P1, when the low-voltage side battery is being charged, is different from that in the period P3, when the high-voltage side battery is being charged, and the input torque T fluctuates when the output of the generator is distributed to the batteries. As a consequence, the generator produces noise and vibrates, adversely affecting its quietness and durability.

According to the conventional apparatus described above, when for example switching from charging the low-voltage system battery to charging the high-voltage system battery, the output current waveform of the generator becomes distorted. When the current waveform is distorted, the torque required to rotate the input axis of the generator (hereinafter abbreviated as "input torque") fluctuates. The input torque is determined by the output voltage and output current of the generator, and power comprising electrical energy is generated by applying the rotatory power (e.g. rotary output of an engine), which is generated by the input torque, to the input axis of the generator. Therefore, when the waveform of the output current becomes distorted during charging, the input torque fluctuates, whereby the generator produces noise and vibrates, adversely affecting its quietness and durability.

In FIG. 1, the input axis of the generator ACG is coupled to the output axis of the engine, and the input axis of the generator ACG is rotated by the output of the engine, generating ac output.

According to one method for charging, when the output voltage of the generator is insufficient due to the low number of rotations of the engine, the output of the generator is boosted to obtain the voltage required for charging, and, when the number of rotations of the engine has increased, boosting stops and the battery is charged directly. However, as explained below, according to the battery charging apparatus which uses this type of charging method, when starting and stopping the boosting, the torque required to rotate the input axis of the generator (hereinafter abbreviated as "input torque") abruptly changes, creating allophones.

The mechanism which generates this type of torque fluctuation will be explained.

FIG. 13 shows characteristics of the input torque and output current (charge current) of the generator with respect to the number of rotations of the input axis. The number of rotations of the generator varies in accordance with the number of rotations of the engine. As shown in FIG. 13, when the output of the generator is increased before charging (boost charging), the voltage required for charging the battery is maintained in the region of low rotation, and the output current of the generator is consumed as charge current, generating input torque in the generator. As the number of rotations increases, the output current of the generator increases, consequently increasing the input torque. Since there is also some loss when switching to boost the voltage, the increase in the output current is restricted.

By contrast, when the battery is charged directly without increasing the output of the generator (direct charging), the voltage required for charging the battery cannot be obtained in the region of low rotation; as a result, the battery cannot be charged and the output current is not consumed as charge current. Therefore, the input torque is a torque which has been generated by factors other than charging, such as the mechanical friction and inertia of the electrical elements. When the number of rotations of the engine is increased until the output voltage is sufficient to charge the battery, the output current becomes charge current. When the number of rotations of the engine is further increased, the output current increases, exceeding the output current during boost charging at intersection B. As the output current increases, the input torque increases also, exceeding the input torque during boost charging at point C. It is possible to switch between boosting and non-boosting, i.e. between boost charging and direct charging, by switching the duty of the boost switching.

Due to the different control statuses when boost charging and direct charging, the number of rotations at the intersection B between the output currents does not necessarily match the number of rotations at intersection C of the input torques. Therefore, with regard to voltage stability of the battery, for example, when the number of rotations R (B) at point B, where the output currents of the generator match, is selected as the number of rotations for switching boosting on/off, the difference Td between the input torques causes the input torque of the generator to abruptly change, generating allophones. In FIG. 14, the number of rotations begins to increase at time t1, and when number of rotations R (B) is reached at time t2, the duty DR of the boost switching is switched. Consequently, the input torque T abruptly fluctuates due to the difference Td in the torques. Similarly, the input torque T abruptly fluctuates when the number of rotations drops and exceeds the number of rotations R (B) at time t6. In this way, the input torque abruptly fluctuates when switching boosting on and off, generating allophones.

In addition to the problems mentioned above, there is a further problem, explained below, that the input torque of the generator fluctuates when the output of the generator is distributed to the low-voltage system battery and the high-voltage system battery, generating noise and vibrations in a similar manner.

The input torque is determined by the output voltage and output current of the generator, and there is a correlative relationship between the input torque of the generator and the power consumed in charging. When the output voltage of the generator is constant, the greater the charge current, the greater the input torque of the generator; when the output current of the generator is constant, the greater the charge voltage, the greater the input torque of the generator. Applying the rotatory power (e.g. rotary output of an engine), which is generated by the input torque, to the input axis of the generator from the outside generates power comprising electrical energy. Therefore, ideally, when the rotatory power applied to the input axis of the generator is constant, the output voltage and output current should be set so that the output power is constant.

However, in reality, even when a constant rotatory power is applied to the generator, fluctuation in the load changes the output voltage, and consequently, due to the characteristics of the generator, the output current cannot make the output power constant and the output power becomes liable to change. For this reason, as shown in FIG. 11, the size of the input torque T in the period P1, when the low-voltage side battery is being charged, is different from that in the period P3, when the high-voltage side battery is being charged, and fluctuates when the output of the generator is distributed to the batteries. As a consequence, the generator produces noise and vibrates, adversely affecting its quietness and durability.

SUMMARY OF THE INVENTION

The present invention has been realized in consideration of the above. It is a first object of the present invention to provide a battery charging apparatus in which fluctuation in the input torque of a generator, occuring when the output of a generator is distributed to batteries of a high-voltage system and a low-voltage system, can be effectively reduced, thereby preventing noise and vibration which are caused by fluctuation in the input torque.

The battery charging apparatus of the present invention comprises a generator (corresponding, for example, to a generator ACG explained later) which generates ac power; a first charging system (corresponding, for example, to diodes D1 to D3 and field-effect transistors Q1 to Q3, explained later) which distributes the output of the generator at a timing in synchronism with the output of the generator to a first battery of a low-voltage system, thereby charging the first battery; a second charging system (corresponding, for example, to diode D4 to D6 explained later) which distributes the output of the generator at a timing in synchronism with the output of the generator and different to the timing of charging the first battery to a second battery of a high-voltage system, thereby charging the second battery; and a switch system (corresponding, for example, to field-effect transistors Q4 to Q6 explained later) which chops the output of the generator which is to be distributed to the second battery so as to reduce change in the output power of the generator.

According to this constitution, since the switch system chops the output of the generator, the output voltage of the generator is kept at a sufficient voltage for charging the second battery of the high-voltage system, while the output power of the generator changes. Therefore, by for example setting the chopping ratio appropriately, it is possible to control the input torque of the generator, making the input torque when charging the low-voltage system battery substantially equal to the input torque when charging the high-voltage system battery. Consequently, it is possible to effectively eliminate fluctuation in the input torque of the generator when distributing the output of the generator to the high-voltage system and low-voltage system batteries, preventing noise and vibration caused by fluctuation in the input torque. The switching operation of the switch system may be such as to boost the output of the generator.

In the battery charging apparatus described above, the first charging system comprises a first diode (corresponding, for example, to diodes D1 to D3 explained later), an anode thereof being connected to an output terminal side of the generator and a cathode thereof being connected to an electrode side of the first battery; and a first field-effect transistor (corresponding, for example, to field-effect transistors Q1 to Q3 explained later), provided between the cathode of the first diode and the electrode of the first battery, the first field-effect transistor becoming conductive when the first battery is to be charged and becoming nonconductive when the the battery is to be charged; the second charging system comprising a second diode (corresponding, for example, to diodes D4 to D6 explained later), an anode thereof being connected to an output terminal side of the generator and a cathode thereof being connected to an electrode side of the second battery; and the switch system comprising a second field-effect transistor (corresponding, for example, to field-effect transistors Q4 to Q6 explained later), provided between the output terminal of the generator and ground, the second field-effect transistor switching and chopping the output of the generator based on a clock signal having a duty which is set so as to reduce change in the output power of the generator.

According to this constitution, when the first field-effect transistor turns on and becomes conductive, the first diode becomes sequence-biased, and the output of the generator is distributed via this first diode to the low-voltage system first battery, charging the first battery. On the other hand, when the first field-effect transistor turns off and becomes nonconductive, the output voltage of the generator increases, whereby the second diode becomes sequence-biased, and the output of the generator is distributed via this second diode to the high-voltage system second battery, charging the second battery. At this time, the second field-effect transistor switches based on the clock signal, chopping the output of the generator supplied to the second battery. Therefore, the output power is adjusted so as to eliminate fluctuation in the input torque of the generator.

Further, in the battery charging apparatus described above, the conduction of the second field-effect transistor is controlled in compliance with change in the output phase of the generator when charging the first battery, and based on the clock signal when charging the second battery (corresponding, for example, to a controller CTL explained later)

According to this constitution, when charging the first battery, the first diode and the second field-effect transistor form an all wave rectifier, rectifying all waves of the output of the generator and supplying it to the first battery. Furthermore, when charging the second battery, the second diode and the second field-effect transistor form an all wave rectifier, and the second field-effect transistor functions as a switch system for making the output current of the generator resemble a sine wave. Consequently, the output of the generator can be distributed to the low-voltage system and high-voltage system batteries while reducing fluctuation in the input torque of the generator.

Further, in the battery charging apparatus described above, the generator generates current in multiple phases (corresponding, for example, to three-phase ac current U-phase, V-phase, and W-phase explained later), and the first and second diodes and the first and second field-effect transistors are provided for each of the multiple phases.

According to this constitution, the multiple phases of the generator can be supplied to the batteries along independent charge paths. Consequently, interference and current density in the charge paths can be reduced, stabilizing the charging operation.

The present invention achieves the following effects.

Since the output of the generator to be distributed to the high-voltage system battery is chopped so as to reduce change in the output power of the generator when charging the high-voltage system and the low-voltage system, it is possible to effectively eliminate fluctuation in the input torque of the generator when distributing the output of the generator to the high-voltage system and low-voltage system batteries. Therefore, noise and vibration caused by fluctuation in the input torque can be prevented. Furthermore, since noise and vibration of the generator are prevented, the quietness and durability of the generator are increased.

Further, in the battery charging apparatus described above, the first charging system comprises a first diode, connected between the output terminal side of the generator and the electrode side of the first battery; and a first field-effect transistor, provided between the cathode of the first diode and the electrode of the first battery; the second charging system comprises a second diode, connected between the output terminal side of the generator and the electrode side of the second battery; and the switch system comprises a second field-effect transistor, provided between the output terminal of the generator and ground. Therefore, the output of the generator supplied to the second battery can be chopped, adjusting output power of the generator so as to reduce fluctuation in the input torque of the generator.

Further, in the battery charging apparatus described above, the conduction of the second field-effect transistor is controlled in compliance with change in the output phase of the generator when charging the first battery, and based on the clock signal when charging the second battery. Therefore, the output of the generator can be distributed to the high-voltage system battery and the low-voltage system battery while reducing fluctuation in the input torque of the generator.

Further, in the battery charging apparatus described above, the generator generates current in multiple phases (corresponding, for example, to three-phase ac current U-phase, V-phase, and W-phase explained later), and the first and second diodes and the first and second field-effect transistors are provided for each of the multiple phases. Therefore, the phases of the output of the generator can be supplied to the batteries via independent charge paths. Consequently, interference and current density in the charge paths can be reduced, stabilizing the charging operation.

It is a second object of this invention to reduce distortion in the output current wave form of the generator when distributing the output of the generator to the low-voltage system and high-voltage system batteries, and to prevent noise and vibration, which are caused by such distortion of the output current wave form.

In order to achieve the above object, the present invention has the following constitution.

The battery charging apparatus according to this invention comprises a generator corresponding, for example, to a generator ACG explained later) which generates ac power; a first charging system (corresponding, for example, to diodes D1 to D3 and field-effect transistors Q1 to Q3, explained later) which distributes the output of the generator at a timing in synchronism with the output of the generator to a first battery of a low-voltage system, thereby charging the first battery; a second charging system (corresponding, for example, to diode D4 to D6 explained later) which distributes the output of the generator at a timing in synchronism with the output of the generator, and in the same cycle as the cycle which the first battery is charged in, to a second battery of a high-voltage system, thereby charging the second battery; and a switch system (corresponding, for example, to field-effect transistors Q4 to Q6 explained later) which chops the output of the generator which is to be distributed to the second battery so that the output power wave form of the generator resembles a sine wave.

According to this constitution, since the switch system chops the output of the generator, the output voltage of the generator is kept at a sufficient voltage for charging the second battery of the high-voltage system, while the output current wave form of the generator resembles a sine wave. Therefore, when distributing the output of the generator to the first battery of the low-voltage system and the second battery of the high-voltage system, fluctuation in the input torque, caused by distortion in the output current wave form of the generator, can be reduced, thereby achieving the abovementioned object.

Further, in the battery charging apparatus described above, the first charging system comprises the first charging system comprises a first diode (corresponding, for example, to diodes D1 to D3 explained later), an anode thereof being connected to an output terminal side of the generator and a cathode thereof being connected to an electrode side of the first battery; and a first field-effect transistor (corresponding, for example, to field-effect transistors Q1 to Q3 explained later), provided between the cathode of the first diode and the electrode of the first battery, the first field-effect transistor becoming conductive when the first battery is to be charged and becoming nonconductive when the battery is to be charged; the second charging system comprises a second diode (corresponding, for example, to diodes D4 to D6 explained later), an anode thereof being connected to an output terminal side of the generator and a cathode thereof being connected to an electrode side of the second battery; and the switch system comprises a second field-effect transistor (corresponding, for example, to field-effect transistors Q4 to Q6 explained later), provided between the output terminal of the generator and ground, the second field-effect transistor switching and chopping the output of the generator based on a clock signal having a duty which is set so that the output power wave form of the generator resembles a sine wave.

According to this constitution, when the first field-effect transistor turns on and becomes conductive, the first diode becomes sequence-biased, and the output of the generator is distributed via this first diode to the low-voltage system first battery, charging the first battery. On the other hand, when the first field-effect transistor turns off and becomes nonconductive, the output voltage of the generator increases, whereby the second diode becomes sequence-biased, and the output of the generator is distributed via this second diode to the high-voltage system second battery, charging the second battery. At this time, the second field-effect transistor switches based on the clock signal, chopping the output of the generator supplied to the second battery. Therefore, the output voltage of the generator is kept at a voltage needed for charging the second battery, while making the output current wave form of the generator in one cycle resemble a sine wave. Therefore, fluctuation in the input torque, caused by distortion in the output current wave form of the generator, is reduced, achieving the first object mentioned above.

Further, in the battery charging apparatus described above, the conduction of the second field-effect transistor is controlled in compliance with change in the output phase of the generator when charging the first battery, and based on the clock signal when charging the second battery.

According to this constitution, when charging the first battery, the first diode and the second field-effect transistor form an all wave rectifier, rectifying all waves of the output of the generator and supplying it to the first battery. Furthermore, when charging the second battery, the second diode and the second field-effect transistor form an all wave rectifier, and the second field-effect transistor functions as a switch system for making the output current of the generator resemble a sine wave. Consequently, the output of the generator can be distributed to the low-voltage system and high-voltage system batteries while reducing fluctuation in the input torque of the generator, caused by distortion in the output current wave form of the generator.

Further, in the battery charging apparatus described above, the generator generates current in multiple phases, (corresponding, for example, to three-phase ac current U-phase, V-phase, and W-phase explained later), and the first and second diodes and the first and second field-effect transistors are provided for each of the multiple phases.

According to this constitution, the phases of the output of the generator can be supplied to the batteries via independent charge paths. Consequently, interference and current density in the charge paths can be reduced, stabilizing the charging operation.

Incidentally, in the battery charging apparatus, the duty of the clock signal may be set so as to reduce change in the output power of the generator.

As a consequence, the input torque when charging the low-voltage system battery becomes substantially equal to the input torque when charging the high-voltage system battery. Therefore, the difference in input torque when charging the low-voltage system and high-voltage system batteries decreases, making it possible to prevent noise and vibration, which are caused by difference in input torque, when distributin the output of the generator to the low-voltage system first battery and the high-voltage system second battery.

The present invention achieves the following effects.

The output of the generator to be distributed to the high-voltage system battery is chopped, so that the output current wave form of the generator resembles a sine wave when charging the high-voltage system and when charging the low-voltage system. Therefore, distortion in the output current wave form of the generator, occuring when the output of the generator is distributed to the high-voltage system and low-voltage system batteries, can be reduced, preventing noise and vibration, which are caused by distortion in the output current wave form. Therefore, noise and vibration, which are caused by fluctuation in the input torque, can be prevented. Further, since noise and vibration of the generator are prevented, the quietness and durability of the generator are increased.

Further, in the battery charging apparatus described above, the first charging system comprises a first diode, connected between the output terminal side of the generator and the electrode side of the first battery; and a first field-effect transistor, provided between the cathode of the first diode and the electrode of the first battery; the second charging system comprises a second diode, connected between the output terminal side of the generator and the electrode side of the second battery; and the switch system comprises a second field-effect transistor, provided between the output terminal of the generator and ground. Therefore, the output of the generator supplied to the second battery can be chopped, adjusting output power of the generator so as to reduce fluctuation in the input torque of the generator.

Further, in the battery charging apparatus described above, the conduction of the second field-effect transistor is controlled in compliance with change in the output phase of the generator when charging the first battery, and based on the clock signal when charging the second battery. Therefore, the output of the generator can be distributed to the high-voltage system battery and the low-voltage system battery while reducing fluctuation in the input torque of the generator.

Further, since the first and second diodes and the first and second field-effect transistors are provided for each of the multiple phases, the phases of the output of the generator can be supplied to the batteries via independent charge paths. Therefore, interference and current density in the charge paths can be reduced, stabilizing the charging operation.

It is a third object of this invention to eliminate abrupt fluctuation in the input torque when switching boosting of the voltage in accordance with the number of rotations of the input axis of the generator, and thereby provide a battery charging apparatus which can reduce noise and vibration caused by such torque fluctuation.

Furthermore, it is a fourth object of the present invention to provide a battery charging apparatus which can effectively reduce fluctuation in the input torque of the generator when distributing the output of the generator to a low-voltage system battery and a high-voltage system battery, and thereby prevent noise and vibration which are caused by such fluctuation in the input torque.

In order to achieve the above objects, the present invention has the following constitution.

The battery charging apparatus comprises a generator corresponding, for example, to a generator ACG explained later) which generates ac power; a first charging system (corresponding, for example, to diodes D1 to D3 and field-effect transistors Q1 to Q3, explained later) which distributes the output of the generator at a timing in synchronism with the output of the generator to a first battery of a low-voltage system, thereby charging the first battery; a second charging system (corresponding, for example, to diodes D4 to D6 explained later) which distributes the output of the generator at a timing in synchronism with the output of the generator and different to the timing of charging the first battery to a second battery of a high-voltage system, thereby charging the second battery; and a switch system (corresponding, for example, to field-effect transistors Q4 to Q6 explained later) which, when the number of rotations of the input axis of the generator is below a number of rotations providing a boundary between boosting and not-boosting the output voltage of the generator, chops and boosts the output of the generator so as to reduce change in the output power of the generator when charging the first battery and when charging the second battery, and, when the number of rotations of the input axis of the generator exceeds the number of rotations providing the boundary, switches the duty of the output of the generator so as to reduce change in the duty.

According to this constitution, when the number of rotations of the input axis of the generator exceeds the number of rotations providing the boundary, the switch system reduces change in the duty of the output of the generator while switching the duty. For example, when the number of rotations of the input axis of the generator increases to a value greater than the number of rotations providing the boundary, the switch system gradually changes the duty of the output of the generator. The output power of the generator gradually changes in accordance with the change in the duty to a value corresponding to the duty which was switched to by the switch system. Therefore, since the output power does not abruptly change, fluctuation in the input torque is smooth, preventing allophones. When the number of rotations increases, the output of the generator increases and the output power changes; however, in this case, the output power changes in compliance with the number of rotations, and therefore does not cause the input torque to fluctuate.

Further, when the number of rotations of the input axis of the generator is below the number of rotations which provides the boundary (i.e. a low number of rotations), the switch system chops the output of the generator and controls the output of the output, keeping the output voltage of the generator at a voltage sufficient for charging the second battery of the high-voltage system, while adjusting the output power of the generator and reducing fluctuation in the input torque. Therefore, by setting the duty of the output of the generator as appropriate, the input torque when charging the low-voltage system and the input torque when charging the high-voltage system can be made substantially equal. Consequently, it is possible to effectively eliminate fluctuation in the input torque of the generator when distributing the output of the generator to the high-voltage system and low-voltage system batteries, preventing noise and vibration caused by fluctuation in the input torque. The switching operation of the switch system may be such as to boost the output of the generator.

Further, in the battery charging apparatus described above, the first charging system comprises a first diode (corresponding, for example, to diodes D1 to D3 and field-effect transistors Q1 to Q3, explained later), an anode thereof being connected to an output terminal side of the generator and a cathode thereof being connected to an electrode side of the first battery, and a first field-effect transistor, provided between the cathode of the first diode and the electrode of the first battery, the first field-effect transistor becoming conductive when the first battery is to be charged and becoming nonconductive when the the battery is to be charged; the second charging system comprises a second diode (corresponding, for example, to diodes D4 to D6 explained later), an anode thereof being connected to an output terminal side of the generator and a cathode thereof being connected to an electrode side of the second battery; and the switch system comprises a second field-effect transistor (corresponding, for example, to field-effect transistors Q4 to Q6 explained later), provided between the output terminal of the generator and ground, the second field-effect transistor switching based on a clock signal having the abovementioned duty and chopping the output of the generator.

According to this constitution, when the first field-effect transistor turns on and becomes conductive, the first diode becomes sequence-biased, and the output of the generator is distributed via this first diode to the low-voltage system first battery, charging the first battery. On the other hand, when the first field-effect transistor turns off and becomes nonconductive, the output voltage of the generator increases, whereby the second diode becomes sequence-biased, and the output of the generator is distributed via this second diode to the high-voltage system second battery, charging the second battery.

At this time, when the number of rotations of the input axis of the generator exceeds the number of rotations providing the boundary, the second field-effect transistor switches based on the clock signal and gradually changes the duty of the output of the generator which is supplied to the second battery. Consequently, the output power of the generator gradually changes. Therefore, even when the duty of the output of the generator is switched in accordance with change in the number of rotations, the output power of the generator changes smoothly and the input torque does not abruptly change, thereby preventing noise and vibration, which are caused by input torque fluctuation.

Furthermore, in the battery charging apparatus described above, the conduction of the second field-effect transistor is controlled in compliance with change in the output phase of the generator when charging the first battery, and based on the clock signal when charging the second battery (corresponding, for example, to the controller CTL explained later).

According to this constitution, when charging the first battery, the first diode and the second field-effect transistor form an all wave rectifier, rectifying all waves of the output of the generator and supplying it to the first battery. Furthermore, when charging the second battery, the second diode and the second field-effect transistor form an all wave rectifier, and the second field-effect transistor functions as a switch system for making the output current of the generator resemble a sine wave. Consequently, the output of the generator can be distributed to the low-voltage system and high-voltage system batteries while reducing fluctuation in the input torque of the generator.

Furthermore, in the battery charging apparatus described above, the generator generates current in multiple phases (corresponding, for example, to three-phase ac current U-phase, V-phase, and W-phase explained later), and the first and second diodes and the first and second field-effect transistors are provided for each of the multiple phases.

According to this constitution, the phases of the output of the generator can be supplied to the batteries via independent charge paths. Consequently, interference and current density in the charge paths can be reduced, stabilizing the charging operation.

The present invention achieves the following effects.

Since the duty of the output of the generator is switched while reducing change therein, it is possible to eliminate abrupt fluctuation in the input torque when switching the boosting of the voltage in accordance with the number of rotations of the input axis of the generator, thereby eliminating noise and vibration caused by such fluctuation in the input torque. Furthermore, change in the output power of the generator when charging the high-voltage system battery and the low-voltage system battery is reduced. Therefore, it is possible to effectively reduce fluctuation in the input torque of the generator when distributing the output of the generator to the high-voltage system and low-voltage system batteries. Therefore, allophones, noise, vibration, and the like, which are caused by fluctuation in the input torque, can be prevented. Furthermore, since noise and vibration of the generator are prevented, the quietness and durability of the generator are increased.

Further, in the battery charging apparatus described above, the first charging system comprises a first diode, connected between the output terminal side of the generator and the electrode side of the first battery, and a first field-effect transistor, provided between the cathode of the first diode and the electrode of the first battery; the second charging system comprises a second diode, connected between the output terminal side of the generator and the electrode side of the second battery; and the switch system comprises a second field-effect transistor, provided between the output terminal of the generator and ground. Therefore, the output of the generator supplied to the second battery can be chopped, adjusting the output power of the generator so as to reduce fluctuation in the input torque of the generator.

Further, in the battery charging apparatus described above, the conduction of the second field-effect transistor is controlled in compliance with change in the output phase of the generator when charging the first battery, and based on the clock signal when charging the second battery. Therefore, the output of the generator can be distributed to the high-voltage system battery and the low-voltage system battery while reducing fluctuation in the input torque of the generator.

Moreover, in the battery charging apparatus described above, the generator generates ac current in multiple phases (corresponding, for example, to three-phases of ac current: U-phase, V-phase, and W-phase, explained later), and the first and second diodes and the first and second field-effect transistors are provided for each of the multiple phases. Consequently, each phase of the output of the generator can be supplied via an independent charge path to the battery. Therefore, interference and current density in the charge paths can be reduced, stabilizing the charging operation.

DESCRIPTION OF THE PREFERRED EMBODIMENTS

Embodiment 1

A first embodiment of the invention will be explained with reference to the drawings.

Figure 1:
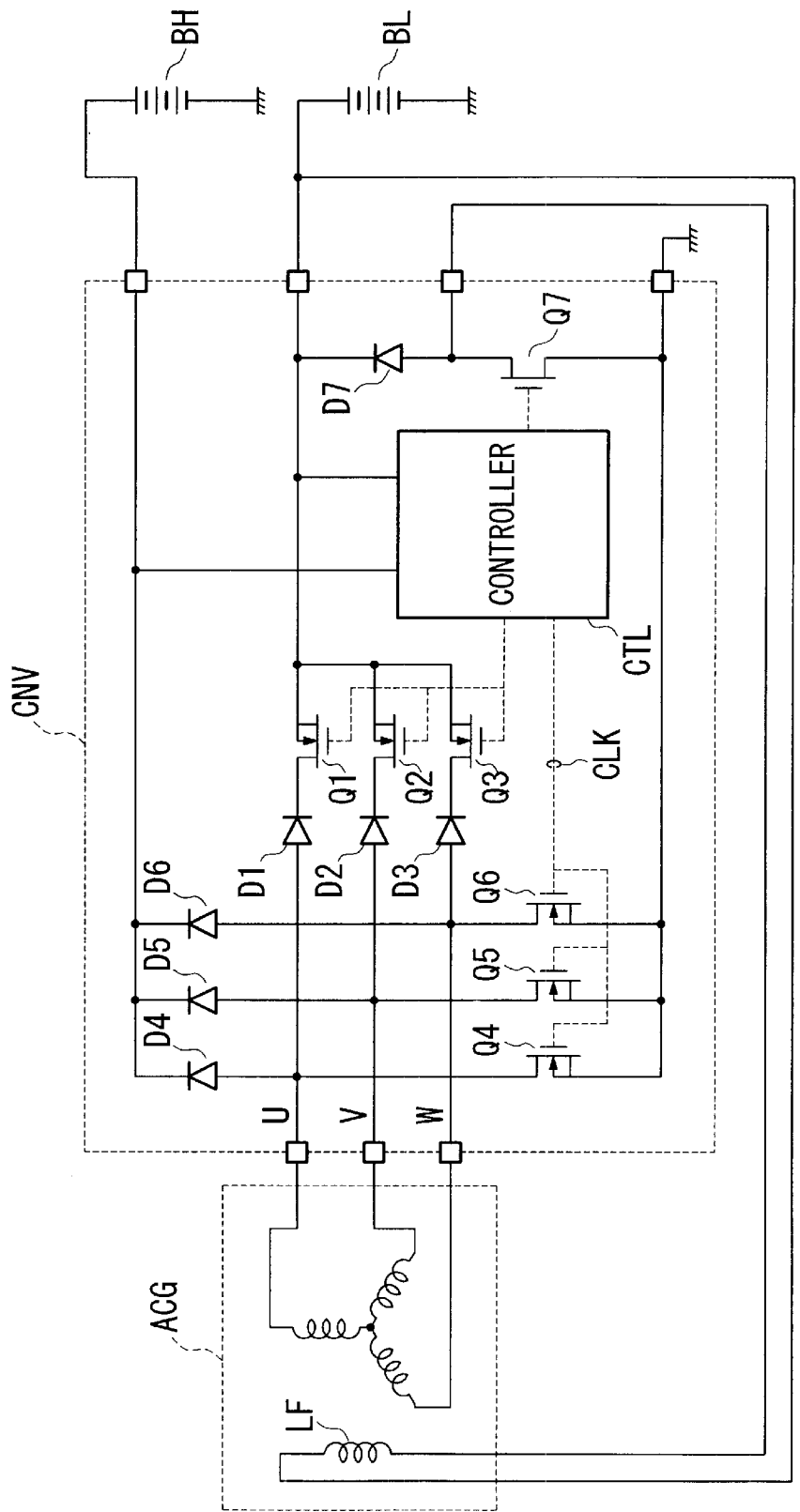
FIG. 1 is a block diagram showing the constitution of a battery charging apparatus according to an embodiment of the present invention.

FIG. 1 shows the constitution of a battery charging apparatus according to a first embodiment of the present invention. In FIG. 1, reference code ACG represents a generator which generates a three-phase ac current (U-phase, V-phase, W-phase), reference code LF represents a field coil of the generator, reference code CNV represents a converter which converts the ac output of the generator to a dc current and distributes it to a battery BL of a low-voltage system (e.g. 12 V) and a battery BH of a high-voltage system (e.g. 42 V).

In the converter CNV, reference codes D1 to D3 represent diodes which rectify the ac output of the generator ACG and supply it to the battery BL of the low-voltage side, and reference codes Q1 to Q3 represent field-effect transistors (n-type) which control the distribution of the output of the generator ACG. The diodes D1 to D3 and the field-effect transistors Q1 to Q3 comprise a first charging system for charging the low-voltage system battery BL.

Reference codes D4 to D6 represent diodes which rectify the ac output of the generator ACG and supply it to the battery BH of the high-voltage side, and comprise a second charging system for charging the high-voltage system battery BH.

Reference codes Q4 to Q6 represent field-effect transistors (n-type) which boost the output of the generator ACG, and comprise a switching system for chopping the output voltage of the generator. Together with the low-voltage system diodes D1 to D3 and the high-voltage system diodes D4 to D6, the field-effect transistors Q4 to Q6 form an all-wave rectifier. Reference code CTL represents a controller which controls the conduction of the field-effect transistors Q1 to Q6. Reference code D7 represents a diode, and Q7 represents a field-effect transistor; these adjust the amount of current which flows to the field coil LF in compliance with the controller CTL.

In this way, the diodes and field-effect transistors which comprise the charge path are provided for each of the phases (U, V, and W) generated by the generator ACG.

The connections between the constituent elements will be explained more specifically.

The anodes of the diodes D1 to D3 are connected to the output terminal of the generator ACG. The field-effect transistors Q1 to Q3 are provided between the cathodes of the diodes D1 to D3 and the positive pole of the battery BL, and are made conductive when the battery BL is to be charged and nonconductive when the battery BH is to be charged. The anodes of the diodes D4 to D6 connect to the output terminal of the generator ACG, and the cathodes connect to the positive pole of the battery BH. The field-effect transistors Q4 to Q6 are provided between the output terminal of the generator ACG and ground. The field-effect transistors Q4 to Q6 switch so as to chop the output of the generator ACG based on a clock signal CLK supplied by the controller CTL. The duty of the clock signal CLK is predetermined so as to reduce change in the output power of the generator caused when the output is distributed.

Figure 2:
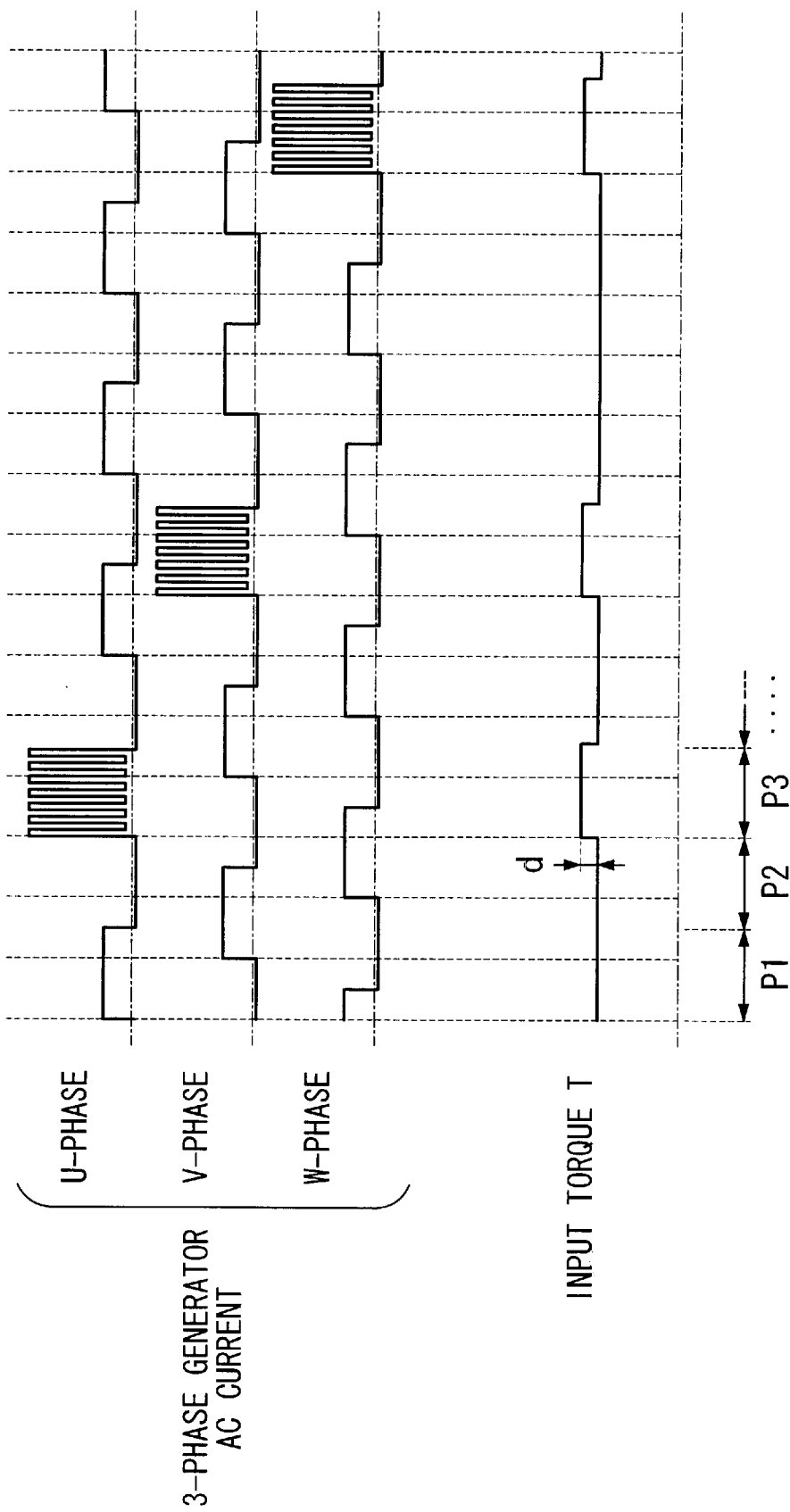
FIG. 2 is a wave form chart showing the operation of the battery charging apparatus according to the first embodiment of the present invention.

Subsequently, the operation of the battery charging apparatus according to the first embodiment will be explained with reference to FIG. 2.

In the first embodiment, the generator ACG can generate a voltage which is sufficient for charging the battery BL of the low-voltage system without being boosted. Since the operation of the battery charging apparatus according to the first embodiment is the same for each of the phases U to W, operation in the U-phase only will be described in the following example.

Firstly, the operation of charging the low-voltage system battery BL will be explained.

The controller CTL detects each of the phases U to W of the generator ACG, and controls the conduction of each of the field-effect transistors Q1 to Q3 in compliance with timings synchronized to each phase. More specifically, the controller CTL switches on the field-effect transistor Q1 at the start point of period P1, during which the U-phase voltage is high. When the field-effect transistor Q1 turns on, the U-phase output of the generator ACG is supplied via the diode D1 to the positive pole of the low-voltage system battery BL. Consequently, the output of the generator ACG is distributed to the low-voltage system battery BL in synchronism with the output of the generator ACG, thereby charging the battery BL.

Next, when the U-phase of the generator switches and the voltage decreases in period P2, the controller CTL switches on the field-effect transistor Q4. Since the negative pole of the battery BL and the source of the field-effect transistor Q4 are both connected via ground, the generator ACG charges the battery BL via the field-effect transistor Q4 which forms the all-wave rectifier. Thus, by forming the all wave rectifier by using the field-effect transistor Q4 and controlling the conduction of the field-effect transistor Q4 in compliance with changes in the phase of the output of the generator, the smaller voltage drop of the field-effect transistor Q4 makes it possible to achieve better charging efficiency than a conventional all wave rectifier which is comprised of diodes only.

In this way, the conduction of the field-effect transistor Q4 is controlled in compliance with change in the output phase of the generator ACG when charging the low-voltage system battery BL.

Subsequently, the operation when charging the high-voltage system battery BH will be explained.

At the start point of period P3, during which the U-phase voltage of the generator ACG increases, the controller CTL switches off the field-effect transistor Q1, and applies the clock signal CLK having a predetermined duty (explained later) to the gate of the field-effect transistor Q4, operating the field-effect transistor Q4 by switching. Consequently, the output voltage of the generator ACG is boosted and supplied to the battery BH of the high-voltage system, charging the battery BH.

While the field-effect transistor Q4 is on, current flows in the armature coil of the generator ACG, accumulating electrical energy in the armature coil. The electrical energy which is accumulated during this period is discharged in multiplex with the electrical energy which is newly generated by the generator ACG while the field-effect transistor Q4 is off, boosting the output voltage of the generator ACG. As a result, the diode D4 becomes sequence-biased, and the U-phase output of the generator ACG is supplied via the diode D4 to the positive pole of the battery BH of the high-voltage system. In this way, the output of the generator ACG is distributed to charge the battery BH in synchronism with the output of the generator ACG but at a different time to when the low-voltage system battery BL is charged.

When the field-effect transistor Q4 switches based on the clock signal CLK for controlling switching, the voltage output from the generator ACG is chopped. By adjusting the duty of the clock signal CLK, as explained later, it is possible to adjust the output power of the generator ACG and reduce fluctuation in the input torque T of the generator ACG. In the first embodiment, "duty of the clock signal CLK" signifies the proportion of one cycle of the clock signal CLK occupied by the pulse width when switching off the field-effect transistor Q4 (Q5 and Q6). Therefore, the clock signal CLK applies the duty for the output pulse of the boosted generator ACG. In the first embodiment, the duty of the clock signal CLK is the same as the duty of the output of the generator ACG. However, the duty of the clock signal CLK need not be the same as the duty of the output of the generator ACG, it being sufficient that there is a constant relationship between the two duties.

When charging the high-voltage system battery BH, the conduction of the field-effect transistor Q4 is controlled based on the clock signal CLK from the controller CTL, thereby boosting the output voltage of the generator ACG and reducing fluctuation in the input torque.

Subsequently, the principle of reducing fluctuation in the input torque of the generator ACG by adjusting the duty of the clock signal CLK for controlling switching will be explained based on FIG. 3.

As already mentioned, the input torque of the generator ACG is dependent on the power needed to charge the batteries BL and BH. Expressed conversely, if it is possible to reduce change in the output power (charge power) of the generator ACG by maintaining the voltages needed to charge the high-voltage system and low-voltage system, then fluctuation in the input torque when distributing the power of the generator can be reduced, and both batteries can be charged successfully.

Figure 3:
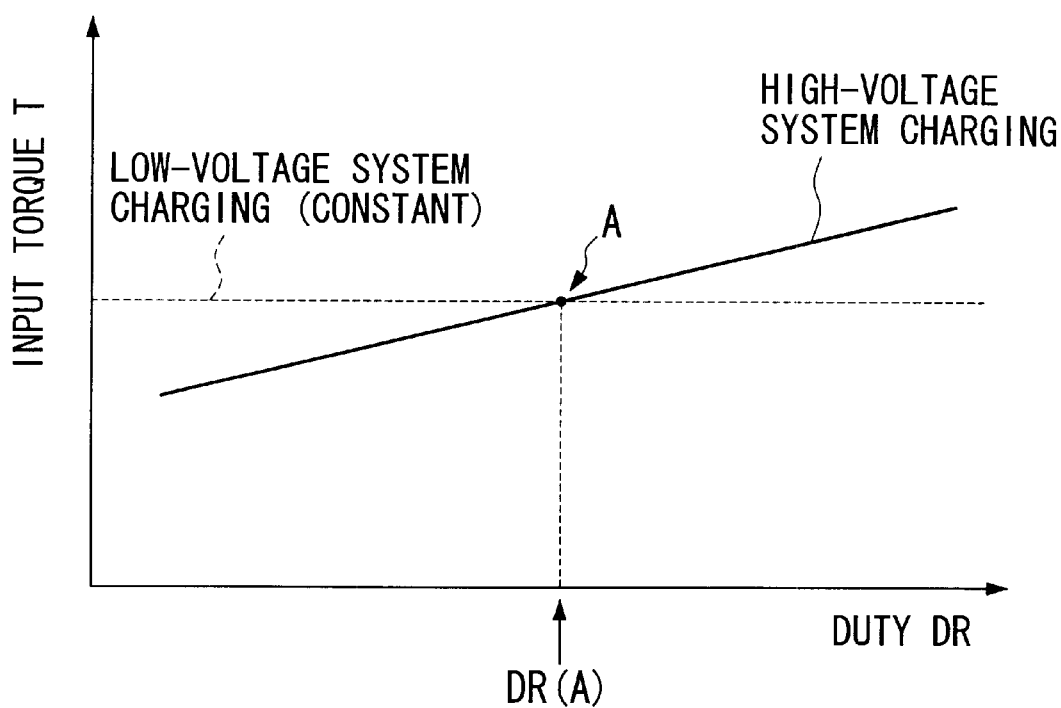
FIG. 3 is a characteristics diagram showing operating principles of the battery charging apparatus according to the embodiment of the present invention.
Figure 4:
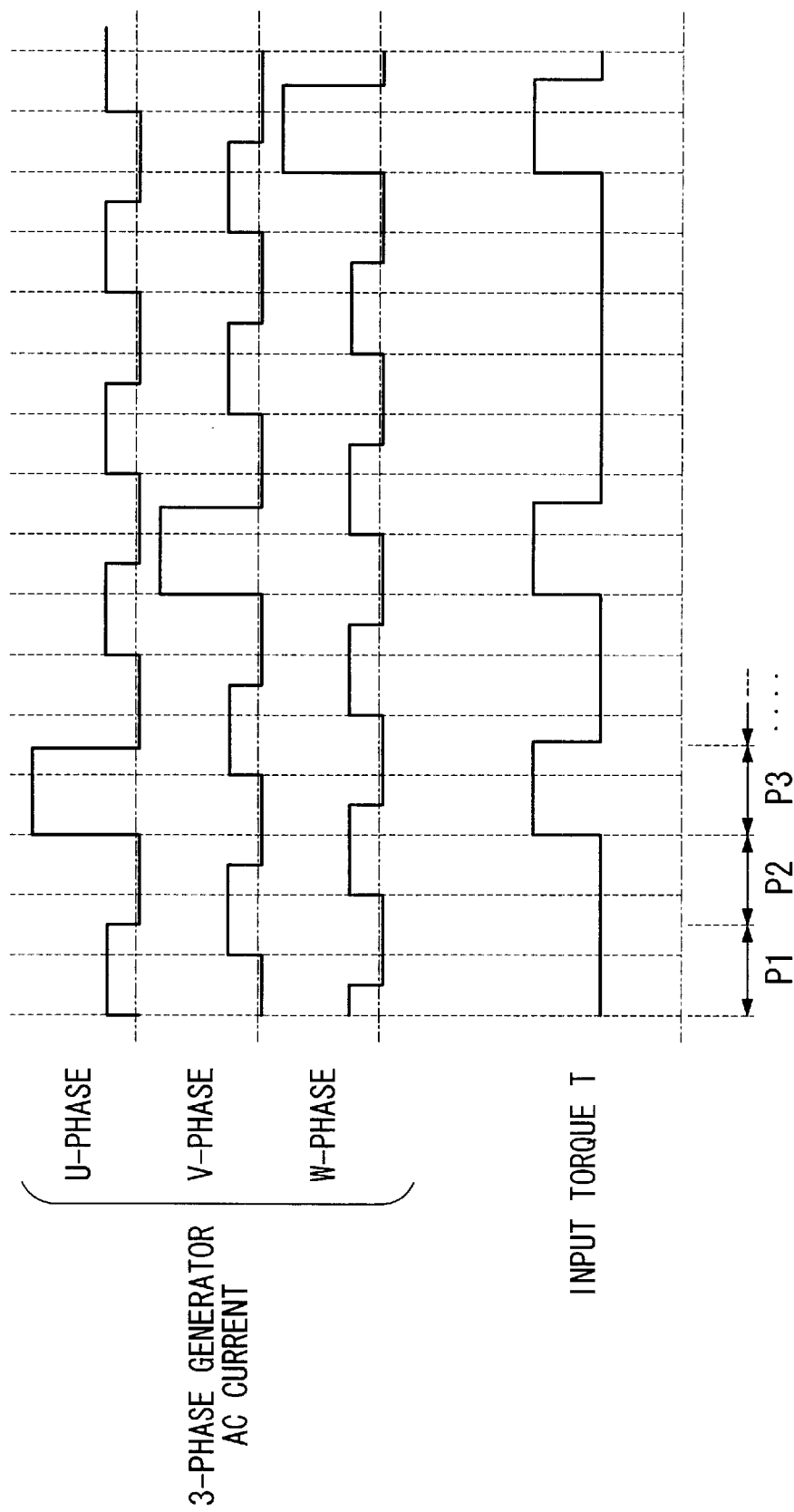
FIG. 4 is a wave form chart showing the operation of a battery charging apparatus.

As shown in FIG. 3, the input torque T when charging the high-voltage system battery BH tends to increase as the duty of the clock signal CLK for controlling switching of the field-effect transistor Q4 increases. On the other hand, when charging the low-voltage system battery BL, the field-effect transistor Q4 is not switched by the clock signal CLK, and consequently the input torque T at this time remains constant with no dependence on the duty DR of the clock signal CLK. Therefore, there is a point of intersection A between the line of characteristics when charging the high-voltage system and the line of characteristics when charging the low-voltage system, and the input torque T at the intersection A is the same when charging the high-voltage system and when charging the low-voltage system.

Accordingly, the duty DR of the clock signal CLK is set to duty DR (A) at the intersection A, and, when the output voltage of the generator ACG is chopped in that state, the output powers of the generator ACG when charging the high-voltage system and when charging the low-voltage system becomes substantially equal, reducing the difference d between the respective input torques T. This reduces fluctuation in the input torque, which occurs when distributing the output of the generator ACG to the low-voltage system battery BL and the high-voltage system battery BH, and prevents noise and vibration of the generator, which are caused by fluctuation in the input torque T. In this way, the field-effect transistor Q4 chops the output of the generator ACG to be distributed to the battery BH so as to reduce fluctuation in the output power of the generator ACG (i.e. the input torque of the generator).

During V-phase and W-phase, the batteries are charged in the same way as during U-phase. In this case, the diodes D2 and D3 function in the same manner as the diode D1, and the field-effect transistors Q2 and Q3 function in the same manner as the field-effect transistor Q1 described above. Furthermore, the diodes D5 and D6 function in the same manner as the diode D4, and the field-effect transistors Q5 and Q6 function in the same manner as the field-effect transistor Q4.

As described above, the output of the generator ACG is distributed to the low-voltage system battery BL and the high-voltage system battery BH while reducing fluctuation of the input torque of the generator ACG; the amount of electricty generated by the generator ACG is controlled by the field current which flows in the field coil LF in accordance with the charge status of each battery. Since no charge power is required when the battery being charged is fully charged, the controller CTL reduces the field current by controlling the switching of the field-effect transistor Q7, thereby reducing the amount of power generated. Conversely, when the battery is still uncharged, the controller CTL increases the field current and thereby increases the power. In this way, according to the battery charging apparatus of the first embodiment, the amount of power generated by the generator ACG is controlled as appropriate in accordance with the charge status of each battery while reducing fluctuation in the input torque. Therefore, noise and vibration, which are caused by fluctuation in the input torque, can be reduced while efficiently charging the batteries.

The present invention is not limited to the first embodiment described above, and can be modified in various ways without deviating from the main principles of the invention. For example, in the first embodiment described above, the output power of the generator ACG is adjusted by switching the field-effect transistors for boosting Q4 to Q6. However, when there is no need to boost to the output voltage of the generator ACG, the field-effect transistors Q4 to Q6 may be connected in series with the diodes D4 to D6 between the battery BH of the high-voltage system and the battery BL of the low-voltage system. In this case, the charge power, supplied to the batteries, is chopped by switching the field-effect transistors Q4 to Q6, thereby adjusting the input torque of the generator ACG.

Furthermore, although the first embodiment comprises the field-effect transistors Q1 to Q3, the constitution is not limited to this, and it is acceptable to commonly connect the cathodes of the diodes D1 to D3, and provide a single field-effect transistor, corresponding to the field-effect transistors Q1 to Q3, between these commonly connected cathodes and the battery BL.

Moreover, in the first embodiment described above, the output of the generator ACG is supplied to the high-voltage system battery BH via the diodes D4 to D6, but the constitution is not limited to this, and field-effect transistors may be provided instead of the diodes D4 to D6, the conduction of these field-effect transistors being controlled in supplement with the field-effect transistors Q1 to Q3.

In the first embodiment, n-type field-effect transistors are used as the field-effect transistors Q1 to Q6, but there is no restriction on this, and p-type field-effect transistors may be used instead.

There are no restrictions on which cycle of the output of the generator ACG should be distributed for charging the low-voltage system or the high-voltage system; this can be determined in accordance with the system which the battery charging apparatus is applied in.

Embodiment 2

Subsequently, a second embodiment of the present invention will be explained.

The battery charging apparatus according to the second embodiment of this invention has the same basic constitution as the first embodiment shown in FIG. 1. The reference code CNV represents a converter which converts the ac output from the generator to a dc current, and distributes it to a battery BL of a low-voltage system (e.g. 12 V) and a battery BH of a high-voltage system (e.g. 36 V).

The field-effect transistors Q4 to Q6 switch based on the clock signal CLK from the controller CTL, and chop the output of the generator ACG. The duty of the clock signal CLK is set beforehand so that the output current wave form of the generator ACG resembles a sine wave. A method for setting the duty will be explained later.

Figure 5:
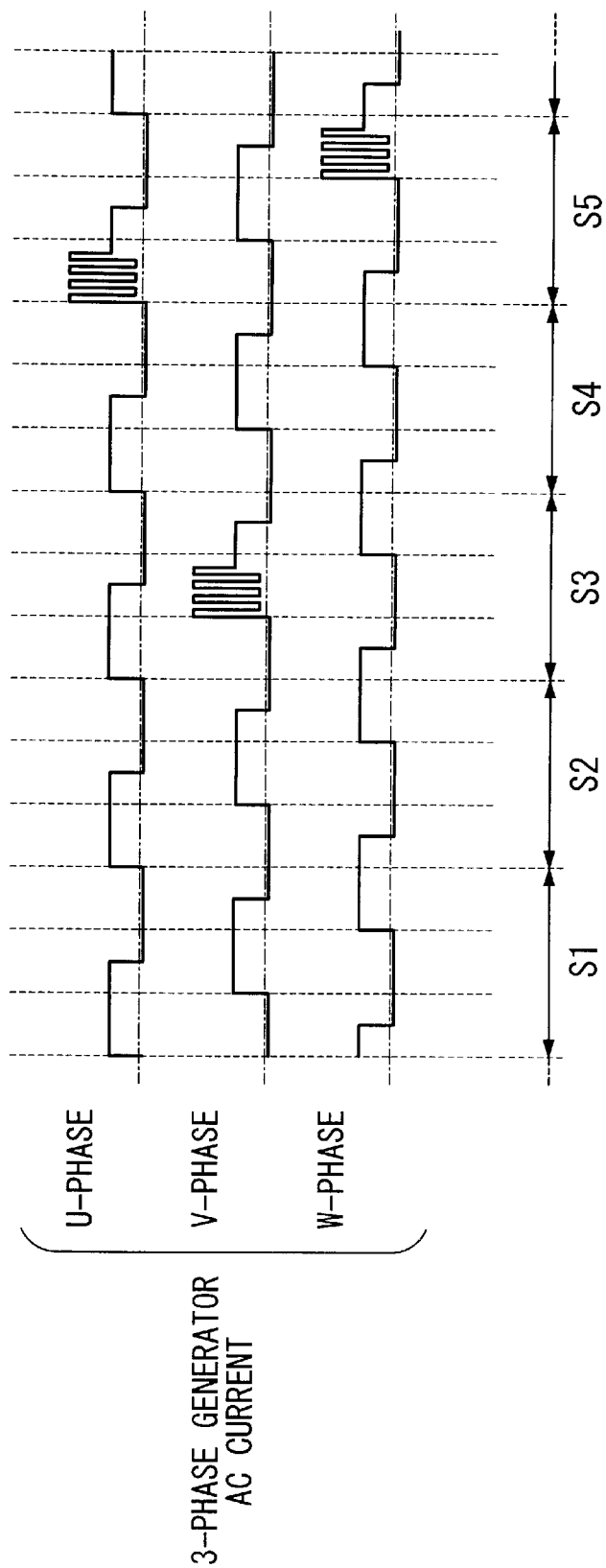
FIG. 5 is a wave form chart showing the overall operation of a battery charging apparatus according to a second embodiment of the present invention.
Figure 6:
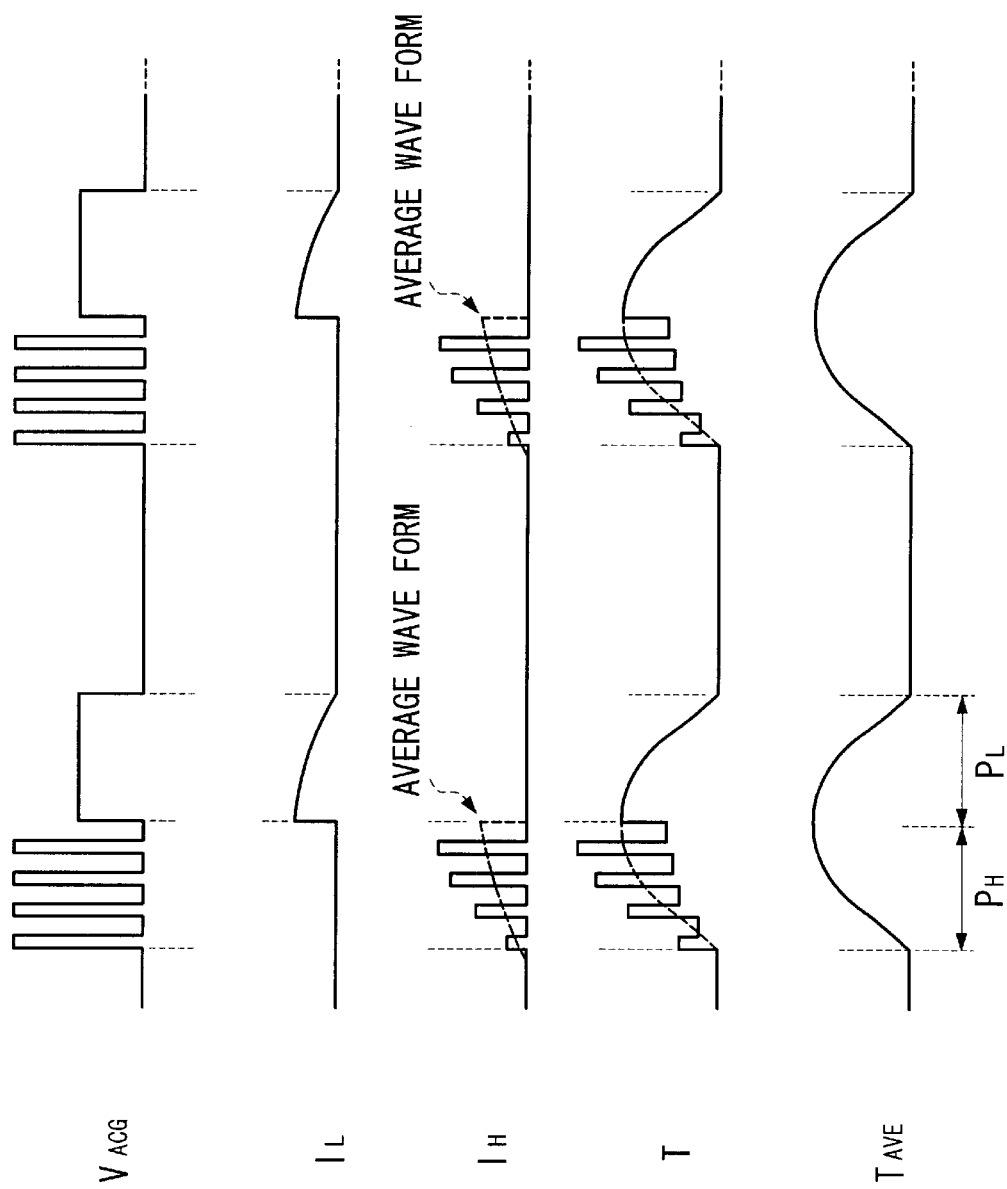
FIG. 6 is a wave form chart showing the detailed operation of the battery charging apparatus according to the second embodiment of the present invention.
Figure 7:
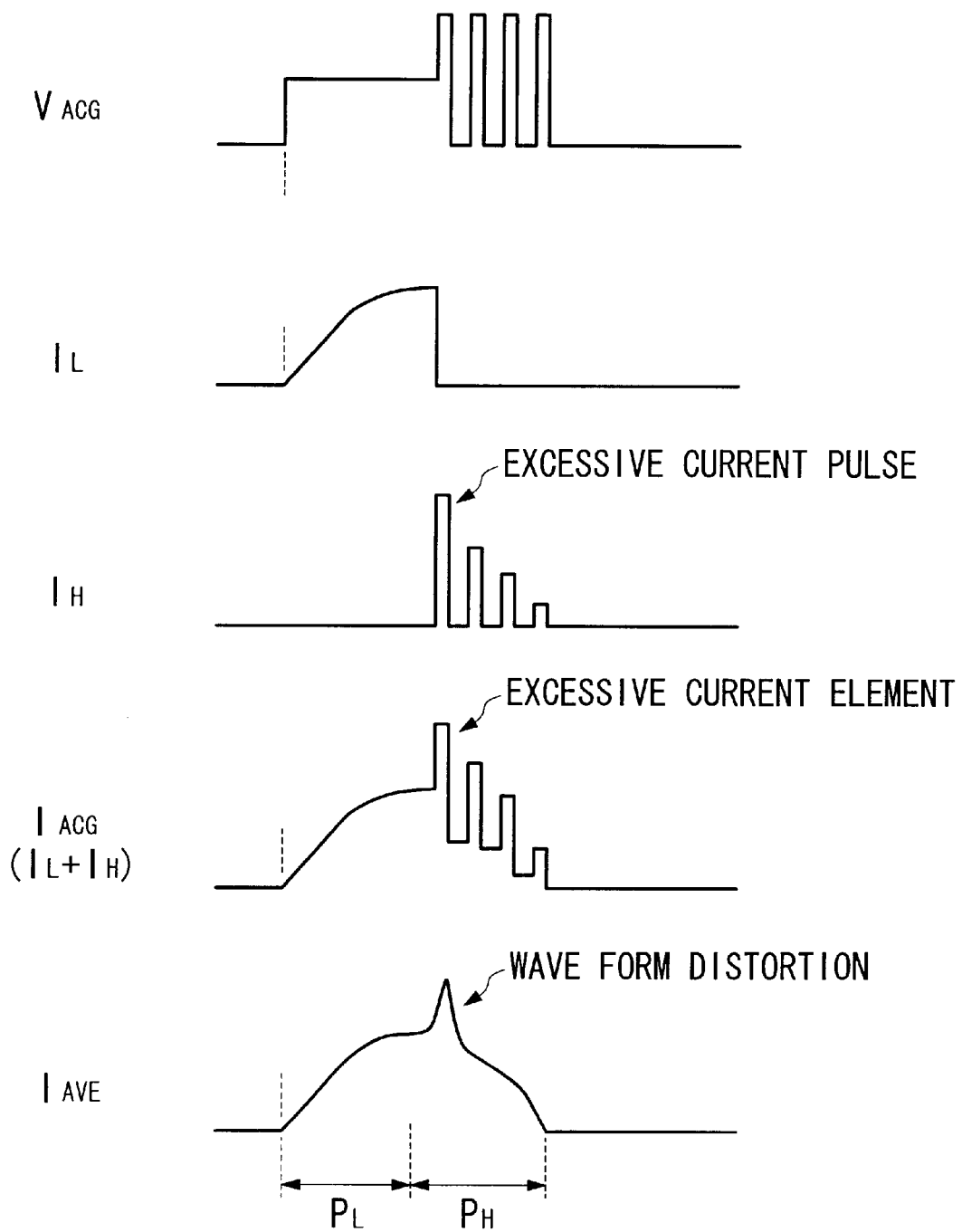
FIG. 7 is a reference diagram showing characteristics of the operation of a battery charging apparatus according to a third embodiment of the present invention.

The operation of the second embodiment will be explained with reference to FIGS. 5 to 7. FIG. 5 is a wave form chart showing the overall operation of a battery charging apparatus, FIG. 3 is a characteristics diagram showing the relationship between the clock signal CLK and the input torque T, FIG. 6 is a wave form chart showing the detailed operation of the battery charging apparatus, and FIG. 7 is a wave form chart showing the relationship between the duty of the clock signal CLK and the output current IH of the generator.

In the second embodiment, the generator ACG can generate a voltage which is sufficient for charging the battery BL of the low-voltage system without being boosted. Since the operation of the battery charging apparatus according to the second embodiment is the same for each of the phases U to W, operation in the U-phase only will be described in the following example.

As explained in detail below, the battery charging apparatus according to the second embodiment charges the high-voltage system battery BH in the same cycle as that which the low-voltage system battery BL is charged in, charging the low-voltage system after charging the high-voltage system.

Firstly, the operation when there is no need to charge the high-voltage system battery BH in the U-phase, such as in cycles S1 to S4 shown in FIG. 5, will be explained. In this case, the controller CTL detects the U-phase of the generator ACG, and controls the conduction of the field-effect transistor Q1 in compliance with a timing in synchronism with the phase, charging the low-voltage system battery BL.

More specifically, the controller CTL switches on the field-effect transistor Q1 at the start point of each cycle which the U-phase voltage increases in. When the field-effect transistor Q1 switches on, the U-phase output of the generator ACG is supplied to the positive pole of the low-voltage system battery BL via the diode D1. That is, the output of the generator ACG is distributed to the low-voltage system battery BL at a timing in synchronism with the output of the generator ACG, charging the battery BL.

Thereafter, when the U-phase of the generator switches during the same cycle and the output voltage of the generator decreases, the controller CTL switches on the field-effect transistor Q4. Since the negative pole of the battery BL and the source of the field-effect transistor Q4 are connected via ground, the generator ACG charges the battery BL via the field-effect transistor Q4 which forms the all-wave rectifier. As in this example, by forming the all wave rectifier by using the field-effect transistor Q4 and controlling the conduction of the field-effect transistor Q4 in compliance with changes in the phase of the output of the generator, the smaller voltage drop of the field-effect transistor Q4 makes it possible to achieve better charging efficiency than a conventional all wave rectifier which is comprised of diodes only.

In this way, the conduction of the field-effect transistor Q4 is controlled in compliance with change in the output phase of the generator ACG when charging the low-voltage system battery BL.

Subsequently, the operation when charging the high-voltage system battery BH in the U-phase, as shown in cycle S5 of FIG. 5, will be explained. In this case, the low-voltage system is charged after first charging the high-voltage system. At the start point of the cycle S5, during which the U-phase voltage of the generator ACG increases, the controller CTL switches off the field-effect transistor Q1, and applies a clock signal CLK having a duty (explained later) to the gate of the field-effect transistor Q4, thereby switching the field-effect transistor Q4 and making it operative. Consequently, the output voltage of the generator ACG is boosted and supplied to the battery BH of the high-voltage system, thereby charging the battery BH.

While the field-effect transistor Q4 is on, current flows in the armature coil of the generator ACG, accumulating electrical energy in the armature coil. The electrical energy which is accumulated during this period is discharged in multiplex with the electrical energy which is newly generated by the generator ACG while the field-effect transistor Q4 is off, boosting the output voltage of the generator ACG. As a result, the diode D4 becomes sequence-biased, and the U-phase output of the generator ACG is supplied via the diode D4 to the positive pole of the battery BH of the high-voltage system. In this way, the output of the generator ACG is distributed to charge the battery BH in synchronism with the output of the generator ACG but at a different time to when the low-voltage system battery BL is charged.

Thus, the high-voltage system battery BH and the low-voltage system battery BL are charged sequentially in the same cycle.

Subsequently, a method for setting the duty of the clock signal CLK will be explained.

In the second embodiment, the duty of the clock signal CLK is set so that there is little or no difference in the input torques when charging the high-voltage system and the low-voltage system, and so that the output current wave form of the generator ACG resembles a sine wave. In this embodiment, "duty of the clock signal CLK" signifies the proportion of one cycle of the clock signal CLK occupied by the pulse width when switching off the field-effect transistor Q4 (Q5 and Q6). Therefore, the clock signal CLK applies the duty for the output pulse of the boosted generator ACG. In this embodiment, the duty of the clock signal CLK is the synonymous with the duty of the output of the generator ACG. However, the duty of the clock signal CLK need not be the same as the duty of the output of the generator ACG, it being sufficient that there is a constant relationship between the two duties.

Subsequently, the principle of reducing the difference in the input torques of the generator ACG by using the duty of the clock signal CLK for controlling switching will be explained based on FIG. 3.

The input torque of the generator ACG is dependent on the power needed to charge the batteries BL and BH. Expressed conversely, if it is possible to reduce change in the output power (charge power) of the generator ACG by maintaining the voltages needed to charge the high-voltage system and low-voltage system, then fluctuation in the input torque when distributing the power of the generator can be reduced, and both batteries can be charged successfully.

As shown in FIG. 3, the input torque T when charging the high-voltage system battery BH tends to increase as the duty of the clock signal CLK for controlling switching of the field-effect transistor Q4 increases. On the other hand, when charging the low-voltage system battery BL, the field-effect transistor Q4 is not switched by the clock signal CLK, and consequently the input torque T at this time remains constant with no dependence on the duty DR of the clock signal CLK. Therefore, there is a point of intersection A between the line of characteristics when charging the high-voltage system and the line of characteristics when charging the low-voltage system, and the input torque T at the intersection A is the same when charging the high-voltage system and when charging the low-voltage system.

Accordingly, the duty DR of the clock signal CLK is set to duty DR (A) at the intersection A, and, when the output voltage of the generator ACG is chopped in that state, the output powers of the generator ACG when charging the high-voltage system and when charging the low-voltage system become substantially equal, reducing the difference between the input torques T. This reduces fluctuation in the input torque, which occurs when distributing the output of the generator ACG to the low-voltage system battery BL and the high-voltage system battery BH, and prevents noise and vibration of the generator, which are caused by fluctuation in the input torque T.

In this way, the conduction of the field-effect transistor Q4 is controlled based on the clock signal CLK from the controller CTL, boosting the output voltage of the generator ACG and reducing the difference in the input torques.

When the duty of the clock signal CLK has been set in the way mentioned above, distortion in the output current wave form of the generator ACG is reduced in the charge periods of the high-voltage system and low-voltage system, so that the output current wave form resembles a sine wave.

As shown in FIG. 6, in the period Ph when the high-voltage system is being charged, the output current IH of the generator ACG is chopped and distributed to the high-voltage system battery BH, charging the battery BH. At this time, since the output current of the generator ACG is led to the armature coil, its waveform does not abruptly change but continues as shown by the average vu wave in FIG. 6. The wave form of the input torque T of the generator ACG corresponds to the wave form of the output current IH. The average torque TAVE, which is obtained by averaging the input torque T, curves smoothly (as shown by the broken line) without distortion.

Hypothetically, when the duty of the clock signal CLK is not set so as to reduce the difference in the input torque (i.e. the output power) when charging the high-voltage system and the low-voltage system, in FIG. 6, the current wave form breaks off at the interface between the output current IL and the output current IH (the interface between the period PL when the low-voltage system is charged and the period PH when the high-voltage system is charged), creating distortion in the current wave form.

By adjusting the duty of the clock signal CLK to obtain an output current wave form having no distortion and resembling a sine wave, fluctuation in the input torque of the generator can be reduced, preventing noise and vibration.

During V-phase and W-phase, the batteries are charged in the same way as during U-phase. In this case, the diodes D2 and D3 function in the same manner as the diode D1, and the field-effect transistors Q2 and Q3 function in the same manner as the field-effect transistor Q1 described above. Furthermore, the diodes D5 and D6 function in the same manner as the diode D4, and the field-effect transistors Q5 and Q6 function in the same manner as the field-effect transistor Q4. When the torques obtained in each phase are synthesized, the input torque of the generator ACG appears substantially constant.

While fluctuation in the input torque of the generator ACG is reduced, the amount of power generated by the generator ACG is controlled by the field current which flows in the field coil LF in accordance with the charge status of each battery. Since no charge power is required when the battery being charged is fully charged, the controller CTL reduces the field current by controlling the switching of the field-effect transistor Q7, thereby reducing the amount of power generated. Conversely, when the battery is still uncharged, the controller CTL increases the field current and thereby increases the power.

As described above, according to the battery charging apparatus of the second embodiment, fluctuation in the input torque, caused by distortion in the wave form of the output current of the generator ACG, can be reduced. Further, the high-voltage system and low-voltage system batteries can be charged in the same cycle. In addition, since the wave form of the output current of the generator ACG resembles a sine wave, ripples in the output current of the generator ACG can be reduced. Therefore, the batteries can be efficiently charged while reducing vibration and noise.

Embodiment 3

Next, a third embodiment of the present invention will be explained.

The battery charging apparatus according to the third embodiment of this invention has the same basic constitution as the second embodiment shown in FIG. 1, except that the low-voltage system battery BL is charged prior to the high-voltage system battery BH. The method for setting the duty of the clock signal CLK is different due to this different charge sequence.

Subsequently, a method for setting the duty of the clock signal CLK will be explained.

Basically, the duty of the clock signal CLK is set so as to reduce the difference in the input torque of the generator ACG, as in the second embodiment. However, as explained below, when the duty obtained in the second embodiment is used unchanged as the duty of the third embodiment, the output current wave form of the generator ACG becomes distorted, causing fluctuation in the input torque and the various problems already mentioned above.

As shown in FIG. 7, when the duty obtained in the second embodiment after charging the low-voltage system is used to charge the high-voltage system, at the time of shifting from the low-voltage system charging period PL to the high-voltage system charging period PH, the output current IH when charging the high-voltage system is output in multiplex with the output current IL in the low-voltage system charging period PL, and the first current pulse of the output current IH becomes excessive. For this reason, the output current IACG, obtained by synthesizing the output current IL and output current IH of the generator, contains this excessive current element, leading to wave form distortion in the average current IAVE. When this current becomes distorted, the input torque fluctuates, causing noise and vibration.

Accordingly, the third embodiment addresses this problem of distortion in the output current of the generator ACG, and controls the duty of the clock signal CLK so as to prevent the wave form from becoming distorted. A method for setting the duty of the clock signal CLK will be explained using FIG. 1 and referring to the wave forms shown in FIG. 8.

Figure 8:
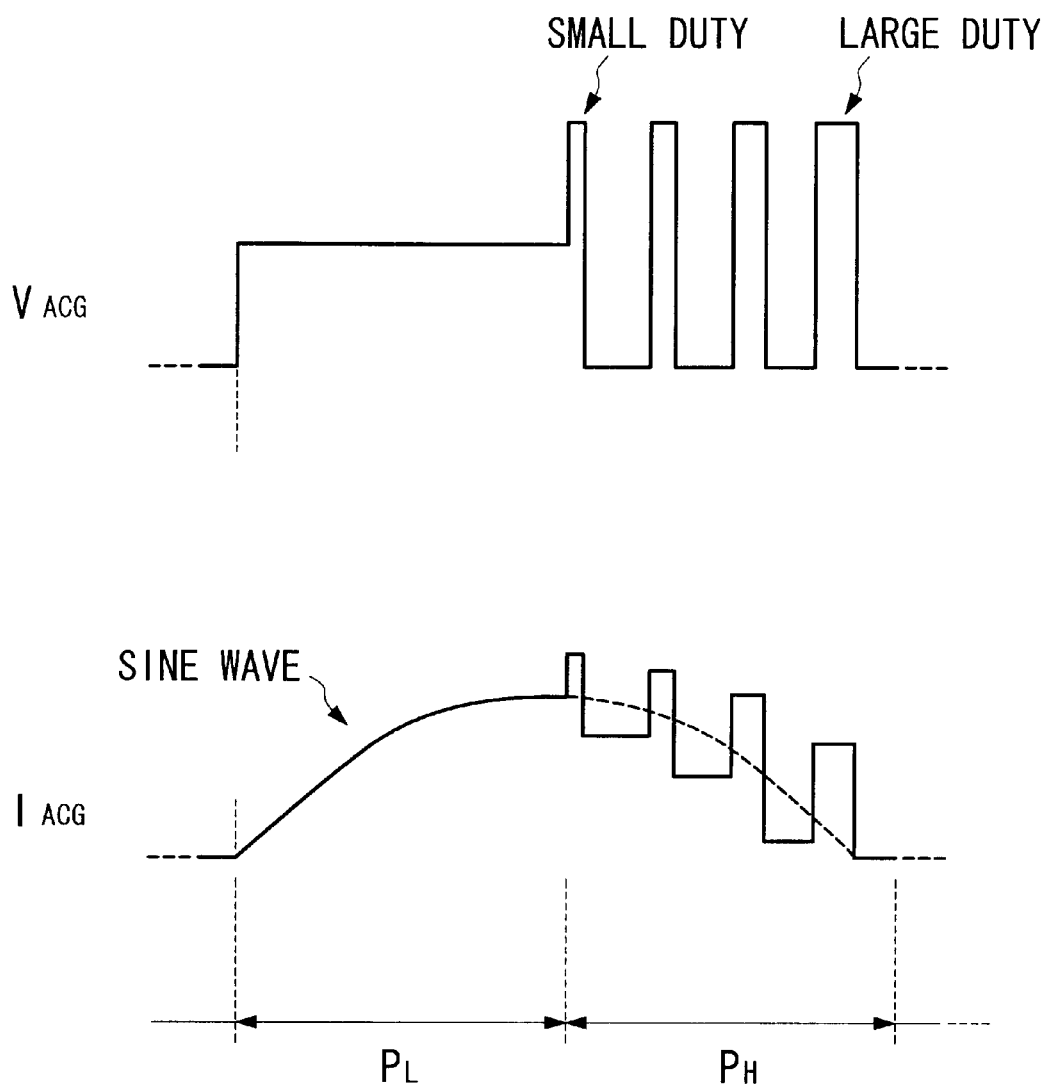
FIG. 8 is a wave form chart showing the operation of the battery charging apparatus according to the third embodiment of the present invention.
Figure 9:
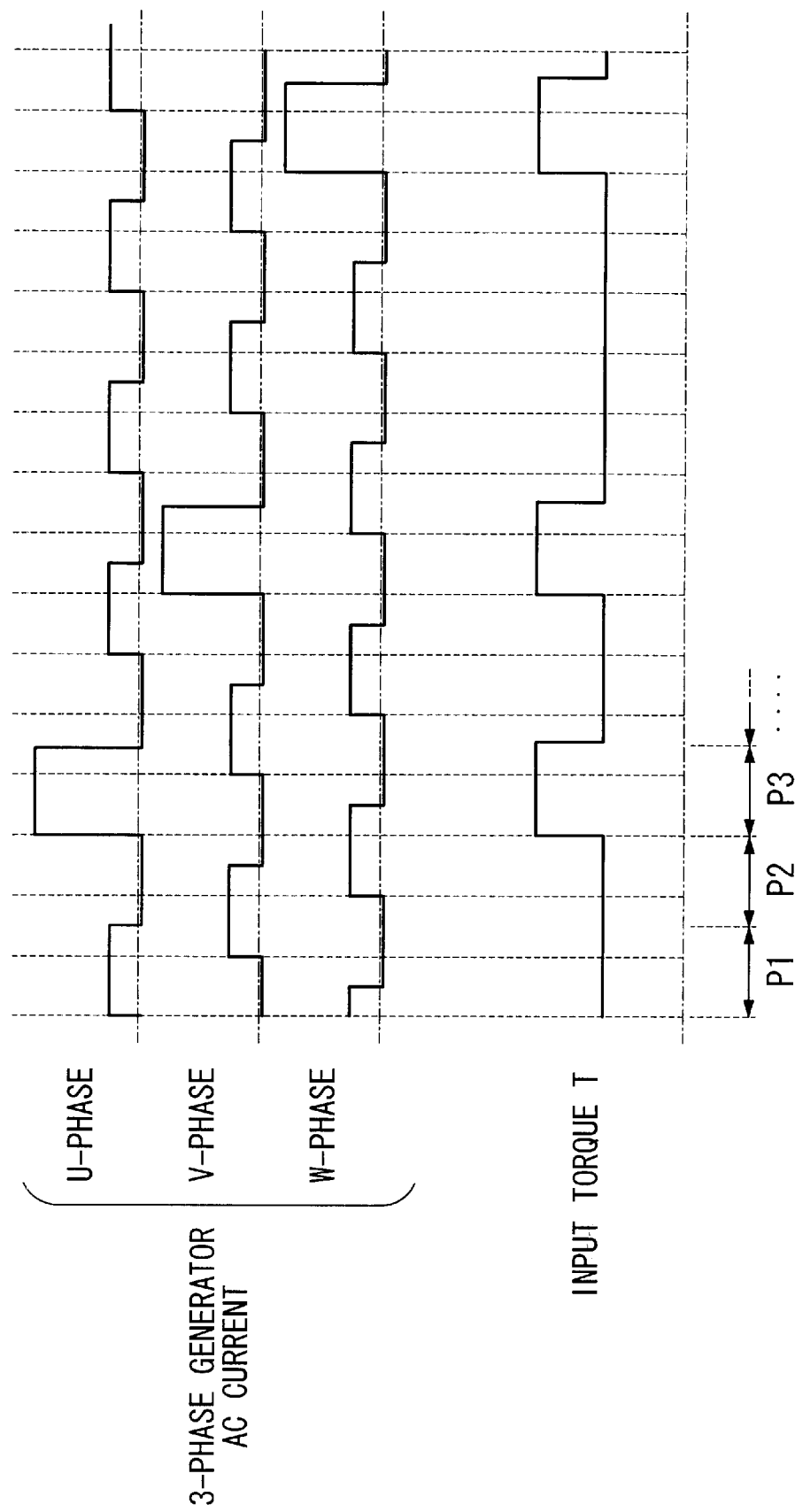
FIG. 9 is a wave form chart showing the operation of a conventional battery charging apparatus.

In the low-voltage system charging period PL shown in FIG. 8, the field-effect transistors Q1 to Q3 of FIG. 1 are on, and the field-effect transistors Q4 to Q6 are off. Consequently, the output of the generator ACG is distributed to the low-voltage system battery BL, charging the battery BL. At this time, the output current of the generator ACG increases along a sine wave.

Subsequently, at the shift to the high-voltage system charging period PH, the field-effect transistors Q1 to Q3 switch off, and the field-effect transistors Q4 to Q6 are switch-operated based on the clock signal CLK, boosting the voltage. As shown in FIG. 8, the controller CTL sets the duty of the clock signal CLK to a small duty at the initial stage of the high-voltage system charging period PH, and to increases gradually thereafter. Therefore, immediately after the shift from the low-voltage system charging period PL to the high-voltage system charging period PH, the peak value of the first current pulse of the output current IACG of the generator is reduced. Consequently, as shown in FIG. 8, when the wave form of the output current IACG of the generator is averaged, it resembles a sine wave.

Therefore, according to the third embodiment, distortion in the output current wave form of the generator ACG, caused by an excessive current pulse, can be eliminated, preventing noise and vibration caused by such wave form distortion.

The present invention is not limited to the third embodiment described above, and can be modified in various ways without deviating from the main principles of the invention. For example, in the third embodiment described above, the output power of the generator ACG is adjusted by switching the field-effect transistors for boosting Q4 to Q6. However, when there is no need to boost to the output voltage of the generator ACG, the field-effect transistors Q4 to Q6 may be connected in series with the diodes D4 to D6 between the battery BH of the high-voltage system and the battery BL of the low-voltage system. In this case, the charge power, supplied to the batteries, is chopped by switching the field-effect transistors Q4 to Q6, thereby adjusting the input torque of the generator ACG.

Furthermore, although the third embodiment comprises the field-effect transistors Q1 to Q3, the constitution is not limited to this, and it is acceptable to commonly connect the cathodes of the diodes D1 to D3, and provide a single field-effect transistor, corresponding to the field-effect transistors Q1 to Q3, between these commonly connected cathodes and the battery BL.

Moreover, in the third embodiment described above, the output of the generator ACG is supplied to the high-voltage system battery BH via the diodes D4 to D6, but the constitution is not limited to this, and field-effect transistors may be provided instead of the diodes D4 to D6, the conduction of these field-effect transistors being controlled in supplement with the field-effect transistors Q1 to Q3.

The third embodiment uses n-type field-effect transistors as the field-effect transistors Q1 to Q6, but there is no restriction on this, and p-type field-effect transistors may be used instead.

Further, in the third embodiment, the duty of the clock signal CLK gradually is gradually increased, but there are no restrictions on this and it is acceptable to set the duty only of the first one clock in the high-voltage system charging period. The duty of the clock signal CLK may be set in any manner, provided that the setting effectively reduces wave form distortion of the output current of the generator ACG.

There are no restrictions on which cycle of the output of the generator ACG should be distributed for charging the low-voltage system or the high-voltage system; this can be determined in accordance with the system which the battery charging apparatus is applied in.

Embodiment 4

Subsequently, a fourth embodiment of the present invention will be explained.

The battery charging apparatus according to the fourth embodiment of this invention charges batteries in a high-voltage system and a low-voltage system, mounted in a hybrid vehicle, and charges the battery of the high-voltage system while switching on/off boosting of the output of the generator in accordance with the number of rotations of the engine.

FIG. 1 shows the constitution of the battery charging apparatus according to the fourth embodiment of the present invention. In FIG. 1, reference code ACG represents a generator which generates a three-phase ac current (U-phase, V-phase, W-phase), reference code LF represents a field coil of the generator, reference code CNV represents a converter which converts the ac output of the generator to a dc current and distributes it to a battery BL of a low-voltage system (e.g. 12 V) and a battery BH of a high-voltage system (e.g. 42 V).

In the converter CNV, reference codes D1 to D3 represent diodes which rectify the ac output of the generator ACG and supply it to the battery BL of the low-voltage side, and reference codes Q1 to Q3 represent field-effect transistors (n-type) which control the distribution of the output of the generator ACG. The diodes D1 to D3 and the field-effect transistors Q1 to Q3 comprise a first charging system for charging the low-voltage system battery BL. Reference codes D4 to D6 represent diodes which rectify the ac output of the generator ACG and supply it to the battery BH of the high-voltage side, and comprise a second charging system for charging the high-voltage system battery BH.

Reference codes Q4 to Q6 represent field-effect transistors (n-type) which boost the output of the generator ACG, and comprise a switching system for chopping the output voltage of the generator. Together with the low-voltage system diodes D1 to D3 and the high-voltage system diodes D4 to D6, the field-effect transistors Q4 to Q6 form an all-wave rectifier.

Reference code CTL represents a controller which controls the conduction of the field-effect transistors Q1 to Q6. When controlling the conduction of the field-effect transistors Q1 to Q6, the controller CTL determines whether or not to boost the output of the generator ACG in accordance with the number of rotations of the engine; when boosting is required, the controller CTL switch-operates the field-effect transistors Q1 to Q6. Reference code D7 represents a diode, and Q7 represents a field-effect transistor; these adjust the amount of current which flows to the field coil LF in compliance with the controller CTL.

In this way, the diodes and field-effect transistors which comprise the charge path are provided for each of the phases (U, V, and W) generated by the generator ACG.

Figure 13:
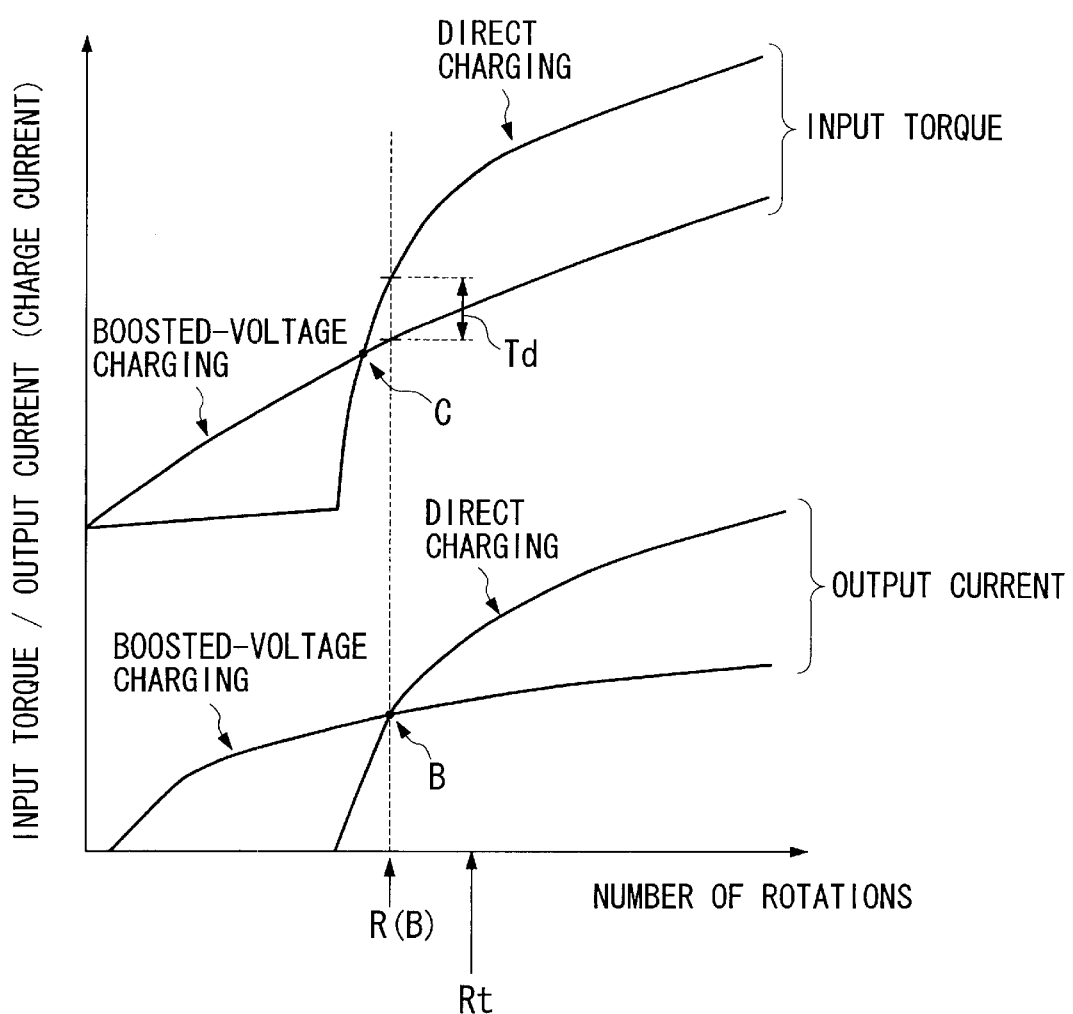
FIG. 13 is a diagram showing the mechanism whereby torque fluctuates when switching between boosting and non-boosting of the number of rotations.
Figure 14:
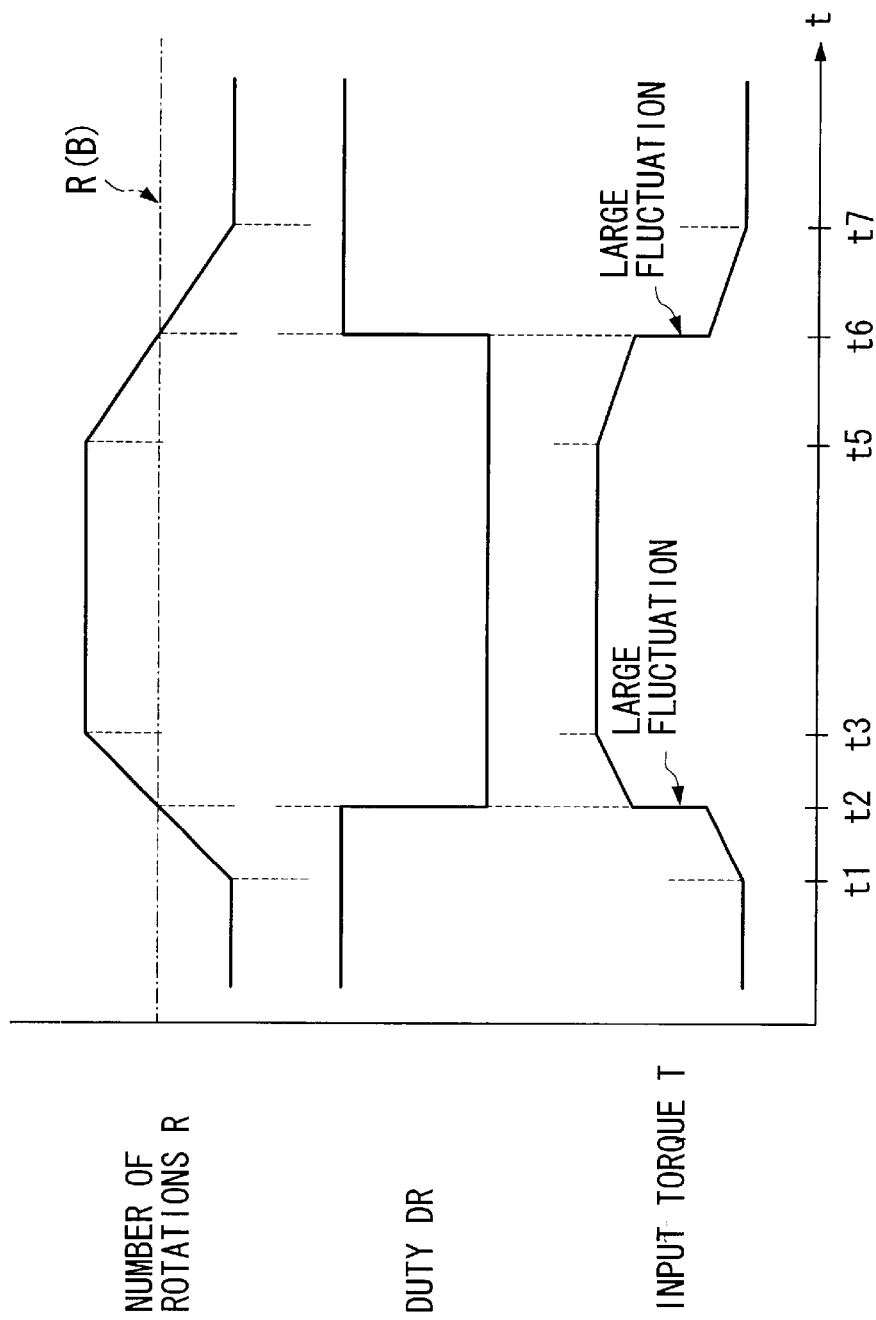
FIG. 14 is a wave form chart showing the operation (at a changing number of rotations) of a conventional battery charging apparatus.

As shown in FIG. 13, in the fourth embodiment, the controller CTL turns voltage-boosting on/off around a boundary comprising a number of rotations Rt, when the output current during direct charging exceeds the output current during charging with boosted voltage. More specifically, in the region below number of rotations Rt, the controller CTL makes the field-effect transistors Q4 to Q6 operative, boosting the output of the generator, and in the region above the number of rotations Rt, the controller CTL makes the field-effect transistors Q4 to Q6 inoperative. The number of rotations Rt provides a boundary of whether or not to boost the voltage output from the generator ACG, and its characteristics are set appropriately, as shown in FIG. 13. In consideration of voltage stability of the battery, the number of rotations Rt should preferably be near the intersection B, but, since the output current characteristics are not stable in this region during direct charging, the number of rotations Rt is set further toward the high-rotation side than the number of rotations R (B).

Subsequently, the connections between the constituent parts will be explained more specifically.

The anodes of the diodes D1 to D3 are connected to the output terminal of the generator ACG. The field-effect transistors Q1 to Q3 are provided between the cathodes of the diodes D1 to D3 and the positive pole of the battery BL, and are made conductive when the battery BL is to be charged and nonconductive when the battery BH is to be charged. The anodes of the diodes D4 to D6 connect to the output terminal of the generator ACG, and the cathodes connect to the positive pole of the battery BH.

The field-effect transistors Q4 to Q6 are provided between the output terminal of the generator ACG and ground. The field-effect transistors Q4 to Q6 switch so as to chop the output of the generator ACG based on a clock signal CLK supplied by the controller CTL. The duty of the clock signal CLK is set so as to reduce change in the output power of the generator caused when the output is distributed. However, as explained later, when turning voltage boosting on/off, the controller CTL switches the duty of the clock signal CLK smoothly so as to reduce change therein.

In the fourth embodiment, "duty of the clock signal CLK" signifies the proportion of one cycle of the clock signal CLK occupied by the pulse width when switching off the field-effect transistor Q4 (Q5 and Q6). Therefore, the clock signal CLK applies the duty for the output pulse of the boosted generator ACG. In the fourth embodiment, the duty of the clock signal CLK is synonymous with the duty of the output of the generator ACG. However, the duty of the clock signal CLK need not be the same as the duty of the output of the generator ACG, it being sufficient that there is a constant relationship between the two duties.

Subsequently, the operation of the battery charging apparatus according to the fourth embodiment will be explained.

In the fourth embodiment, the generator ACG can generate a voltage which is sufficient for charging the battery BL of the low-voltage system without being boosted. Since the operation of the battery charging apparatus according to the fourth embodiment is the same for each of the phases U to W, operation in the U-phase only will be described in the following example. For sake of convenience, the region below the number of rotations Rt is abbreviated as "low rotation region", and the region above the number of rotations Rt is abbreviated as "high rotation region". Furthermore, the number of rotations of the engine will be treated as synonymous with the number of rotations of the input axis.

(1) Operation in the Low Rotation Region

Figure 10:
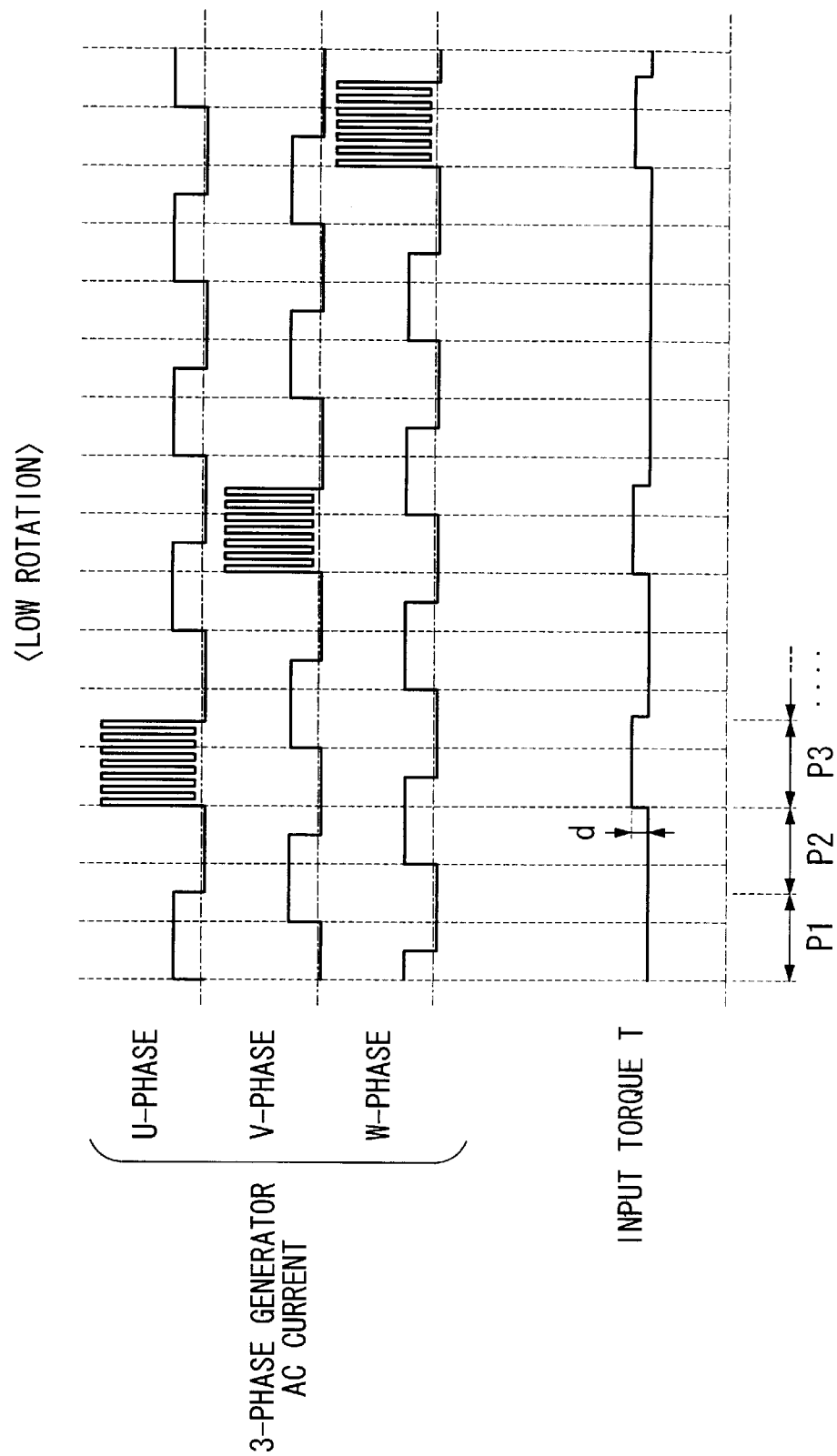
FIG. 10 is a wave form chart showing the operation (at low rotation) of a battery charging apparatus according to a fourth embodiment of the present invention.

When the number of rotations of the engine (number of rotations of the input axis of the generator) is below the number of rotations Rt, the voltage of the generator ACG is not boosted in charging the low-voltage system battery BL, and is only boosted in charging the high-voltage system battery BH. FIG. 10 shows the output wave forms (U-phase, V-phase, and W-phase) of the generator and the wave form of the input torque T in the low rotation region.

Firstly, the operation when charging the low-voltage system battery BL will be explained. The controller CTL detects each of the phases U to W of the generator ACG, and controls the conduction of each of the field-effect transistors Q1 to Q3 in compliance with timings synchronized to each phase. More specifically, the controller CTL switches on the field-effect transistor Q1 at the start point of period P1, during which the U-phase voltage is high. When the field-effect transistor Q1 turns on, the U-phase output of the generator ACG is supplied via the diode D1 to the positive pole of the low-voltage system battery BL. Consequently, the output of the generator ACG is distributed to the low-voltage system battery BL in synchronism with the output of the generator ACG, thereby charging the battery BL.

Next, when the U-phase of the generator switches and the voltage decreases in period P2, the controller CTL switches on the field-effect transistor Q4. Since the negative pole of the battery BL and the source of the field-effect transistor Q4 are both connected via ground, the generator ACG charges the battery BL via the field-effect transistor Q4 which forms the all-wave rectifier. Thus, by forming the all wave rectifier by using the field-effect transistor Q4 and controlling the conduction of the field-effect transistor Q4 in compliance with changes in the phase of the output of the generator, the smaller voltage drop of the field-effect transistor Q4 makes it possible to achieve better charging efficiency than a conventional all wave rectifier which is comprised of diodes only.

In this way, the conduction of the field-effect transistor Q4 is controlled in compliance with change in the output phase of the generator ACG when charging the low-voltage system battery BL, and is not switch-operated based on a clock signal.

Subsequently, the operation when charging the high-voltage system battery BH will be explained. At the start point of period P3, during which the U-phase voltage of the generator ACG increases, the controller CTL switches off the field-effect transistor Q1, and applies the clock signal CLK having a predetermined duty (explained later) to the gate of the field-effect transistor Q4, operating the field-effect transistor Q4 by switching. Consequently, the output voltage of the generator ACG is boosted and supplied to the battery BH of the high-voltage system, charging the battery BH.

While the field-effect transistor Q4 is on, current flows in the armature coil of the generator ACG, accumulating electrical energy in the armature coil. The electrical energy which is accumulated during this period is discharged in multiplex with the electrical energy which is newly generated by the generator ACG while the field-effect transistor Q4 is off, boosting the output voltage of the generator ACG. As a result, the diode D4 becomes sequence-biased, and the U-phase output of the generator ACG is supplied via the diode D4 to the positive pole of the battery BH of the high-voltage system. In this way, the output of the generator ACG is distributed to charge the battery BH in synchronism with the output of the generator ACG but at a different time to when the low-voltage system battery BL is charged.

When the field-effect transistor Q4 switches based on the clock signal CLK for controlling switching, the voltage output from the generator ACG is chopped. By adjusting the duty of the clock signal CLK, as explained later, it is possible to adjust the output power of the generator ACG and reduce fluctuation in the input torque T of the generator ACG.

In this way, when charging the high-voltage system battery BH, the conduction of the field-effect transistor Q4 is controlled based on the clock signal CLK from the controller CTL, thereby boosting the output voltage of the generator ACG and reducing fluctuation in the input torque.

Subsequently, the principle of reducing fluctuation in the input torque of the generator ACG by adjusting the duty of the clock signal CLK for controlling switching will be explained based on FIG. 3.

As already mentioned, the input torque of the generator ACG is dependent on the power needed to charge the batteries BL and BH. Expressed conversely, if it is possible to reduce change in the output power (charge power) of the generator ACG by maintaining the voltages needed to charge the high-voltage system and low-voltage system, then fluctuation in the input torque when distributing the power of the generator can be reduced, and both batteries can be charged successfully.

As shown in FIG. 3, the input torque T when charging the high-voltage system battery BH tends to increase as the duty of the clock signal CLK for controlling switching of the field-effect transistor Q4 increases. On the other hand, when charging the low-voltage system battery BL, the field-effect transistor Q4 is not switched by the clock signal CLK, and consequently the input torque T at this time remains constant with no dependence on the duty DR of the clock signal CLK. Therefore, there is a point of intersection A between the line of characteristics when charging the high-voltage system and the line of characteristics when charging the low-voltage system, and the input torque T at the intersection A is the same when charging the high-voltage system and when charging the low-voltage system.

Accordingly, the duty DR of the clock signal CLK is set to duty DR (A) at the intersection A, and, when the output voltage of the generator ACG is chopped in that state, the output power of the generator ACG when charging the high-voltage system and the output power when charging the low-voltage system become substantially equal, reducing the difference d between the respective input torques T. This reduces fluctuation in the input torque, which occurs when distributing the output of the generator ACG to the low-voltage system battery BL and the high-voltage system battery BH, and prevents noise and vibration of the generator, which are caused by fluctuation in the input torque T. In this way, the field-effect transistor Q4 chops the output of the generator ACG to be distributed to the battery BH so as to reduce fluctuation in the output power of the generator ACG (i.e. the input torque of the generator).

In V-phase and W-phase, the batteries are charged in the same way as in U-phase. In this case, the diodes D2 and D3 function in the same manner as the diode D1, and the field-effect transistors Q2 and Q3 function in the same manner as the field-effect transistor Q1 described above. Furthermore, the diodes D5 and D6 function in the same manner as the diode D4, and the field-effect transistors Q5 and Q6 function in the same manner as the field-effect transistor Q4.

(2) Operation in the High Rotation Region

Figure 11:
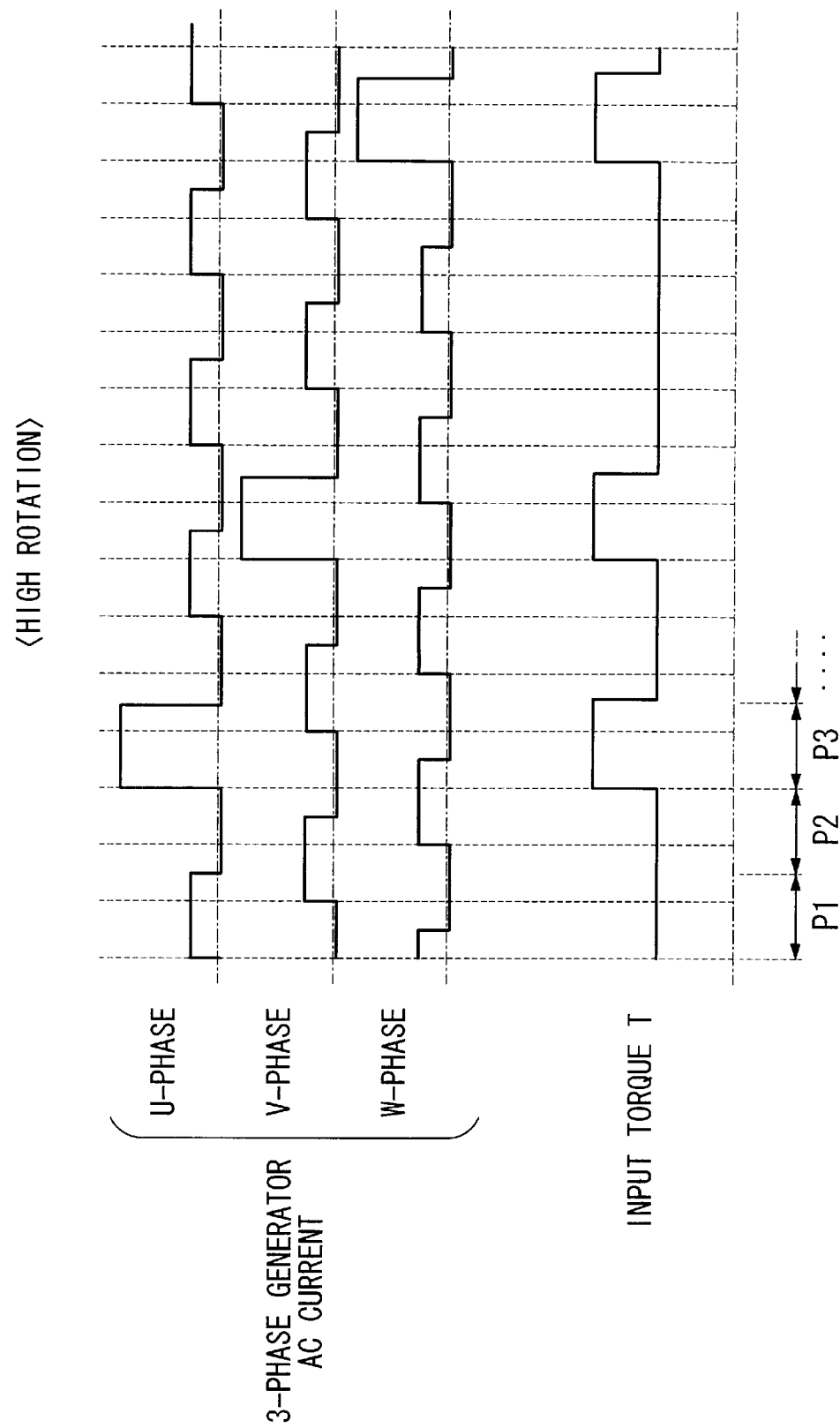
FIG. 11 is a wave form chart showing the operation (at high rotation) of the battery charging apparatus according to the fourth embodiment of the present invention.

When the number of rotations of the engine exceeds the number of rotations Rt, the field-effect transistors Q4 to Q6 are not switched, and when charging either of the low-voltage system and high-voltage system batteries, the operation is the same as when charging the low-voltage system battery in the low rotation region described above. Therefore, as shown in FIG. 11, in for example the charging period P1, the low-voltage system battery is charged in the U-phase of the generator ACG, and, in period P3, the high-voltage system battery is charged in the same manner. At this time, the U-phase voltage wave peaks at a point corresponding to the terminal voltage of the battery.

In the fourth embodiment, voltage-boosting is stopped in the high rotation region. This is for the following reasons.

a. When the number of rotations is high, the output voltage of the generator is sufficient for charging without being boosted.

b. Switching the field-effect transistors Q4 to Q6 causes current loss, reducing the charging efficiency.

c. When the number of rotations of the engine increases, the noise and vibration of the engine and the like also increase, lessening the benefit of reducing the noise and vibration generated by the generator itself.

(3) Operation When Shifting from Low Rotation Region to High Rotation Region

Subsequently, the operation when the number of rotations of the engine exceeds the number of rotations Rt will be explained with reference to FIG. 12. In this case, as described below, when charging the high-voltage system battery, the controller CTL controls the field-effect transistors Q4 to Q6 so as to eliminate change in the duty of the output of the generator ACG while switching the duty of the output. The following explanation concentrates on the high-voltage system battery.

Figure 12:
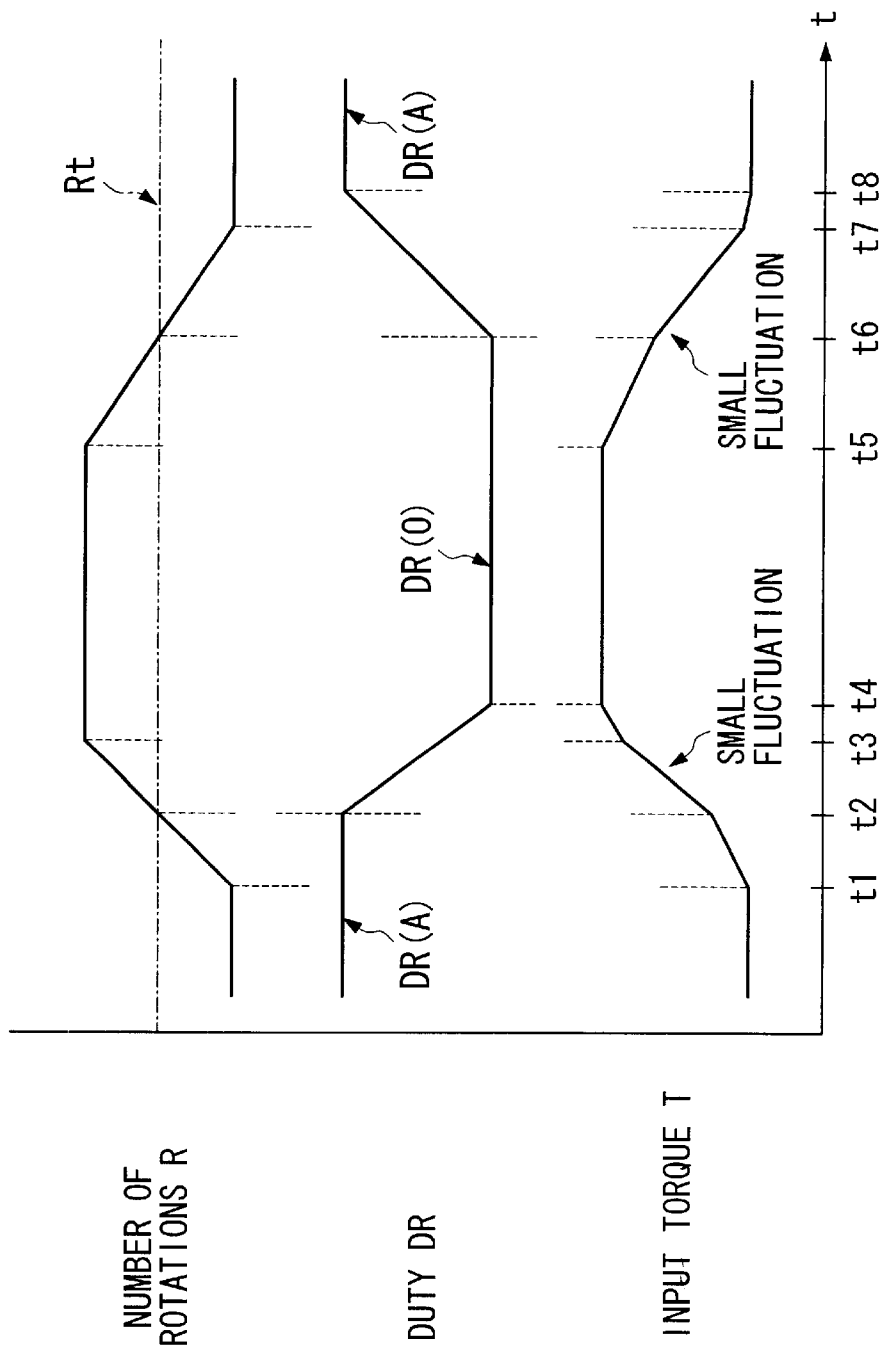
FIG. 12 is a wave form chart showing the operation (at a changing number of rotations) of the battery charging apparatus according to the fourth embodiment of the present invention.

In FIG. 12, prior to time t1, the number of rotations R is in the low rotation region below the number of rotations Rt, and, as already shown in FIG. 3, the output of the generator ACG is boosted and the high-voltage system battery BH is charged. At this time, the field-effect transistor Q4 switches based on the clock signal CLK having a duty DR (A), set so as to reduce fluctuation in the input torque when distributing the output of the generator, chopping the output of the generator ACG, and controlling the output power of the generator ACG so as to reduce fluctuation in the input torque T. Then, when the number of rotations of the engine starts to increase in time t1, the unillustrated output power of the generator ACG also starts to increase, and the input torque T increases in compliance with the increasing output power.

Subsequently, when the number of rotations R reaches the number of rotations Rt in time t2, the controller CTL gradually reduces the duty DR of the clock signal CLK from duty DR (A) to duty DR (0). The duty DR (0) must be set in the high rotation region, and has a value of zero in the fourth embodiment. As the duty DR gradually decreases, the duty of the output of the generator gradually decreases. In other words, change in the duty of the output of the generator is reduced in accordance with change in the duty of the clock signal CLK. As a result, the output power of the generator gradually increases, and the input torque T increases smoothly. That is, fluctuation in the input torque T is reduced.

Subsequently, when the number of rotations R becomes stable in the high rotation region at time t3, the increase in the output power, which accompanies the increase in the number of rotations, stops; consequently, the input torque T continues to increase as the duty DR of the clock signal CLK decreases. Then, when the duty DR reaches the duty DR (0) at time t4, the clock signal CLK becomes secure at the low level. Therefore, the field-effect transistor Q4 does not switch and becomes stable in the off state. Therefore, as shown in FIG. 11, when charging the high-voltage system battery, boosting the output of the generator ACG is stopped and the output is distributed via the diode D4 to the high-voltage system battery BH.

Subsequently, when the number of rotations R starts to decrease at time t5, the output power of the generator ACG decreases and the input torque T starts to gradually decrease. Then, when the number of rotations R reaches the number of rotations Rt at time t6, the controller CTL gradually increases the durty DR of the clock signal CLK from duty DR (0) to duty DR (A). At this time, since the duty DR decreases in addition to the decrease in the number of rotations R, the output power of the generator decreases further, but the change in the duty DR is smooth enough that the output power does not change abruptly, and consequently, the input torque T continues to decrease smoothly. Then, when the number of rotations R becomes stable in the low rotation region at time t7, the input torque T continues to decrease due to the increase in the duty DR. When the duty DR reaches the duty DR (A) at time t8, the input torque T becomes stable at a constant value.

In this way, when the number of rotations R of the input axis of the generator ACG is below the number of rotations Rt, which provides a boundary between boosting and not-boosting the output voltage of the generator, in compliance with the control of the controller CTL, the field-effect transistor Q4 chops and boosts the output of the generator ACG so as to eliminate change in the output power of the generator when charging the low-voltage system battery BL and when charging the high-voltage system battery BH. Then, when the number of rotations R of the input axis of the generator ACG exceeds the number of rotations Rt, the duty DR of the clock signal CLK which controls the switching operation of the field-effect transistor Q4 is switched so as to eliminate change in the duty of the output of the generator ACG. This smoothes any change in the input torque when switching between boosting and not-boosting the voltage in accordance with the number of rotations, reducing fluctuation in the input torque. Therefore, allophones, which are caused by this type of torque fluctuation, are prevented.

As described above, the output of the generator ACG is distributed to the low-voltage system battery BL and the high-voltage system battery BH while reducing fluctuation of the input torque of the generator ACG; the amount of electricty generated by the generator ACG is controlled by the field current which flows in the field coil LF in accordance with the charge status of each battery. Since no charge power is required when the battery being charged is fully charged, the controller CTL reduces the field current by controlling the switching of the field-effect transistor Q7, thereby reducing the amount of power generated. Conversely, when the battery is still uncharged, the controller CTL increases the field current and thereby increases the power. In this way, according to the battery charging apparatus of the fourth embodiment, the amount of power generated by the generator ACG is controlled as appropriate in accordance with the charge status of each battery while reducing fluctuation in the input torque. Therefore, noise and vibration, which are caused by fluctuation in the input torque, can be reduced while efficiently charging the batteries.

The present invention is not limited to the fourth embodiment described above, and can be modified in various ways without deviating from the main principles of the invention. For example, in the fourth embodiment described above, the output of the generator is not boosted when charging the low-voltage system battery, and is boosted or not-boosted in accordance with the number of rotations when charging the high-voltage system battery, but the constitution is not limited to this, and, for example, the low-voltage system battery may also be changed while switching between boosting and not-boosting the voltage in accordance with the number of rotations.

In the fourth embodiment described above, the output of the generator ACG is distributed to the low-voltage system battery BL and the high-voltage system battery BH to charge these batteries, but there is no restriction on this, and it is acceptable to charge only the high-voltage system battery while switching between boosting and not-boosting the voltage in accordance with the number of rotations, or to charge only the low-voltage system battery in this way.

In the fourth embodiment, the output power of the generator ACG is adjusted by switching the field-effect transistors for boosting Q4 to Q6. However, when there is no need to boost to the output voltage of the generator ACG, the field-effect transistors Q4 to Q6 may be connected in series with the diodes D4 to D6 between the battery BH of the high-voltage system and the battery BL of the low-voltage system. In this case, the charge power, supplied to the batteries, is chopped by switching the field-effect transistors Q4 to Q6, thereby adjusting the input torque of the generator ACG.

Furthermore, although the fourth embodiment comprises the field-effect transistors Q1 to Q3, the constitution is not limited to this, and it is acceptable to commonly connect the cathodes of the diodes D1 to D3, and provide a single field-effect transistor, corresponding to the field-effect transistors Q1 to Q3, between these commonly connected cathodes and the battery BL.

Moreover, in the fourth embodiment described above, the output of the generator ACG is supplied to the high-voltage system battery BH via the diodes D4 to D6, but the constitution is not limited to this, and field-effect transistors may be provided instead of the diodes D4 to D6, the conduction of these field-effect transistors being controlled in supplement with the field-effect transistors Q1 to Q3.

In the fourth embodiment, n-type field-effect transistors are used as the field-effect transistors Q1 to Q6, but there is no restriction on this, and p-type field-effect transistors may be used instead.

There are no restrictions on which cycle of the output of the generator ACG should be distributed for charging the low-voltage system or the high-voltage system; this can be determined in accordance with the system which the battery charging apparatus is applied in.

What is claimed is:

1. A battery charging apparatus comprising:
   a generator which generates ac power;
   a first charging system which distributes the output of said generator at a timing in synchronism with the output of said generator to a first battery of a low-voltage system, thereby charging the first battery;
   a second charging system which distributes the output of said generator at a timing in synchronism with the output of said generator and different to the timing of charging said first battery to a second battery of a high-voltage system, thereby charging the second battery; and
   a switch system which chops the output of said generator which is to be distributed to said second battery so as to reduce change in the output power of said generator.

2. The battery charging apparatus according to claim 1, said first charging system comprising
   a first diode, an anode thereof being connected to an output terminal side of said generator and a cathode thereof being connected to an electrode side of said first battery; and
   a first field-effect transistor, provided between the cathode of said first diode and the electrode of said first battery, the first field-effect transistor becoming conductive when said first battery is to be charged and becoming nonconductive when said said battery is to be charged;
   said second charging system comprising a second diode, an anode thereof being connected to an output terminal side of said generator and a cathode thereof being connected to an electrode side of said second battery; and
   said switch system comprising a second field-effect transistor, provided between the output terminal of said generator and ground, the second field-effect transistor switching and chopping the output of said generator based on a clock signal having a duty which is set so as to reduce change in the output power of said generator.

3. The battery charging apparatus according to claim 2, the conduction of said second field-effect transistor being controlled in compliance with change in the output phase of said generator when charging said first battery, and based on said clock signal when charging said second battery.

4. The battery charging apparatus according to claims 2 and 3, wherein said generator generates current in multiple phases, and said first and second diodes and said first and second field-effect transistors are provided for each of the multiple phases.

5. A battery charging apparatus comprising:

a generator which generates ac power;

a first charging system which distributes the output of said generator at a timing in synchronism with the output of said generator to a first battery of a low-voltage system, thereby charging the first battery;

a second charging system which distributes the output of said generator at a timing in synchronism with the output of said generator, and in the same cycle as the cycle which said first battery is charged in, to a second battery of a high-voltage system, thereby charging the second battery; and a switch system which chops the output of said generator which is to be distributed to said second battery so that the output power wave form of said generator resembles a sine wave.

6. The battery charging apparatus according to claim 5, said first charging system comprising a first diode, an anode thereof being connected to an output terminal side of said generator and a cathode thereof being connected to an electrode side of said first battery; and a first field-effect transistor, provided between the cathode of said first diode and the electrode of said first battery, the first field-effect transistor becoming conductive when said first battery is to be charged and becoming nonconductive when said said battery is to be charged;

said second charging system comprising a second diode, an anode thereof being connected to an output terminal side of said generator and a cathode thereof being connected to an electrode side of said second battery; and said switch system comprising a second field-effect transistor, provided between the output terminal of said generator and ground, the second field-effect transistor switching and chopping the output of said generator based on a clock signal having a duty which is set so that the output power wave form of said generator resembles a sine wave.

7. The battery charging apparatus according to claim 6, the conduction of said second field-effect transistor being controlled in compliance with change in the output phase of said generator when charging said first battery, and based on said clock signal when charging said second battery.

8. The battery charging apparatus according to claim 6, wherein said generator generates current in multiple phases, and said first and second diodes and said first and second field-effect transistors are provided for each of the multiple phases.

9. A battery charging apparatus comprising:

a generator which generates ac power;

a first charging system which distributes the output of said generator at a timing in synchronism with the output of said generator to a first battery of a low-voltage system, thereby charging the first battery;

a second charging system which distributes the output of said generator at a timing in synchronism with the output of said generator and different to the timing of charging said first battery to a second battery of a high-voltage system, thereby charging the second battery; and a switch system which, when the number of rotations of the input axis of said generator is below a number of rotations providing a boundary between boosting and not-boosting the output voltage of said generator, chops and boosts the output of said generator so as to reduce change in the output power of said generator when charging the first battery and when charging the second battery, and, when the number of rotations of the input axis of said generator exceeds the number of rotations providing said boundary, switches the duty of the output of said generator so as to reduce change in said duty.

10. The battery charging apparatus according to claim 9, said first charging system comprising a first diode, an anode thereof being connected to an output terminal side of said generator and a cathode thereof being connected to an electrode side of said first battery; and a first field-effect transistor, provided between the cathode of said first diode and the electrode of said first battery, the first field-effect transistor becoming conductive when said first battery is to be charged and becoming nonconductive when said said battery is to be charged;

said second charging system comprising a second diode, an anode thereof being connected to an output terminal side of said generator and a cathode thereof being connected to an electrode side of said second battery; and said switch system comprising a second field-effect transistor, provided between the output terminal of said generator and ground, the second field-effect transistor switching based on a clock signal having said duty and chopping the output of said generator.

11. The battery charging apparatus according to claim 10, the conduction of said second field-effect transistor being controlled in compliance with change in the output phase of said generator when charging said first battery, and based on said clock signal when charging said second battery.

12. The battery charging apparatus according to claim 10, wherein said generator generates current in multiple phases, and said first and second diodes and said first and second field-effect transistors are provided for each of the multiple phases.

* * * * *